United States Patent
Xu et al.

(10) Patent No.: US 11,763,496 B2
(45) Date of Patent: Sep. 19, 2023

(54) SOCIAL NETWORKING BASED ON ASSET ITEMS

(71) Applicant: Lemon Inc., Grand Cayman (KY)

(72) Inventors: Tianyang Xu, Los Angeles, CA (US);
Xiaojie Li, Los Angeles, CA (US);
Yuxi Zhang, Los Angeles, CA (US);
Qingyu Chen, Los Angeles, CA (US);
Peilin Li, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/491,098

(22) Filed: Sep. 30, 2021

(65) Prior Publication Data
US 2023/0100490 A1 Mar. 30, 2023

(51) Int. Cl.
*G06F 3/0482* (2013.01)
*G06T 11/00* (2006.01)
*H04L 65/60* (2022.01)
*H04N 5/265* (2006.01)

(52) U.S. Cl.
CPC ............ *G06T 11/00* (2013.01); *G06F 3/0482* (2013.01); *H04L 65/60* (2013.01); *H04N 5/265* (2013.01); *G06F 2203/04803* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 10,331,983 B1 | 6/2019 | Yang et al. | |
| 10,549,198 B1 | 2/2020 | Zhang | |
| 10,606,824 B1 | 3/2020 | Fire et al. | |
| 11,030,786 B1 * | 6/2021 | Bondich | G06T 11/60 |
| 11,069,094 B1 * | 7/2021 | Evangelista | G06T 11/60 |
| 11,184,471 B2 | 11/2021 | Vaananen | |
| 2010/0250581 A1 | 9/2010 | Chau | |

(Continued)

FOREIGN PATENT DOCUMENTS

| | | |
|---|---|---|
| CN | 111784845 A | 10/2020 |
| CN | 113038148 A | 6/2021 |
| WO | WO 2020/021319 A1 | 1/2020 |

OTHER PUBLICATIONS

International Patent Application No. PCT/SG2022/050697; Int'l Search Report; dated Apr. 10, 2023; 4 pages.

(Continued)

*Primary Examiner* — Ryan Barrett
(74) *Attorney, Agent, or Firm* — BakerHostetler

(57) ABSTRACT

The present disclosure describes techniques for social networking based on trading asset items. The techniques comprise sending a request by a first client computing device for connecting with a second client computing device, displaying a first video comprising a first user and a second video comprising a second user on an interface, determining a first body part of the first user based on a selection of a representative of a first asset item associated with the second user, determining a position of rendering an image of the first asset item on the interface, rendering the image of the first asset item and combining the image into the first video for display of an effect of the first asset item being tried on the first body part of the first user, and receiving the first asset item from the second user based on the effect and user input.

20 Claims, 17 Drawing Sheets

(56) References Cited

U.S. PATENT DOCUMENTS

| | | | |
|---|---|---|---|
| 2013/0073387 A1 | 3/2013 | Heath | |
| 2015/0262391 A1 | 9/2015 | Chau | |
| 2016/0127682 A1* | 5/2016 | Turbell | G11B 27/031 |
| | | | 348/14.03 |
| 2016/0196665 A1* | 7/2016 | Abreu | G06T 11/00 |
| | | | 345/427 |
| 2017/0278289 A1 | 9/2017 | Marino et al. | |
| 2017/0300987 A1 | 10/2017 | Williams et al. | |
| 2018/0048831 A1* | 2/2018 | Berwick | G11B 27/031 |
| 2018/0053056 A1 | 2/2018 | Rabinovich et al. | |
| 2018/0097866 A1* | 4/2018 | Pique Corchs | H04N 21/6582 |
| 2018/0278879 A1* | 9/2018 | Saban | G06T 7/246 |
| 2018/0285686 A1 | 10/2018 | Pinheiro et al. | |
| 2018/0318719 A1 | 11/2018 | Ma et al. | |
| 2019/0019011 A1 | 1/2019 | Ross et al. | |
| 2019/0108686 A1 | 4/2019 | Spivack et al. | |
| 2019/0228547 A1 | 7/2019 | Chandarana et al. | |
| 2019/0371067 A1 | 12/2019 | Simari et al. | |
| 2020/0039068 A1 | 2/2020 | Kim | |
| 2020/0066045 A1 | 2/2020 | Stahl et al. | |
| 2020/0126316 A1* | 4/2020 | Sharma | G06T 17/20 |
| 2020/0151962 A1* | 5/2020 | Holmes | G06F 3/04815 |
| 2020/0267349 A1* | 8/2020 | Garrido | G06F 3/0488 |
| 2020/0358983 A1* | 11/2020 | Astarabadi | G06V 40/171 |
| 2021/0152997 A1 | 5/2021 | Manivasagam et al. | |
| 2021/0173480 A1 | 6/2021 | Osterhout et al. | |
| 2021/0225086 A1* | 7/2021 | Kormandel | G06T 17/10 |
| 2021/0346791 A1* | 11/2021 | Atli | A63F 13/48 |
| 2021/0365574 A1 | 11/2021 | Blaikie, III et al. | |
| 2021/0366196 A1* | 11/2021 | Chepizhenko | H04L 51/046 |
| 2022/0101566 A1* | 3/2022 | Boscolo | G06V 20/20 |
| 2022/0172438 A1* | 6/2022 | Savchenkov | G06T 11/001 |
| 2022/0207802 A1* | 6/2022 | Troutman | G06N 20/00 |
| 2022/0207917 A1* | 6/2022 | Lyu | G06V 40/174 |
| 2022/0292794 A1* | 9/2022 | Golobokov | H04L 51/04 |
| 2022/0300732 A1* | 9/2022 | Eirinberg | G06F 3/0482 |
| 2022/0351424 A1* | 11/2022 | Kasper | G06T 13/40 |
| 2022/0414661 A1 | 12/2022 | Hassanzadeh et al. | |

OTHER PUBLICATIONS

International Patent Application No. PCT/SG2022/050692; Int'l Search Report; dated Apr. 10, 2023; 4 pages.

* cited by examiner

1500

```
┌─────────────────────────────────────────────────────────────────────────┐
│  Send a request by a first client computing device associated with a first user for │
│  connecting with a second client computing device associated with a second user 1502 │
└─────────────────────────────────────────────────────────────────────────┘
                                      │
                                      ▼
┌─────────────────────────────────────────────────────────────────────────┐
│ Display a first video comprising the first user and a second video comprising the second │
│                          user on an interface 1504                       │
└─────────────────────────────────────────────────────────────────────────┘
                                      │
                                      ▼
┌─────────────────────────────────────────────────────────────────────────┐
│ Determine a first body part of the first user in the first video based on a selection of a │
│        representative of a first asset item associated with the second user 1506 │
└─────────────────────────────────────────────────────────────────────────┘
                                      │
                                      ▼
┌─────────────────────────────────────────────────────────────────────────┐
│ Determine a position of rendering an image of the first asset item on the interface for │
│ display of an effect of the first asset item being tried on the first body part of the first │
│                                  user 1508                               │
└─────────────────────────────────────────────────────────────────────────┘
                                      │
                                      ▼
┌─────────────────────────────────────────────────────────────────────────┐
│  Render the image of the first asset item and combining the image into the first video │
│                                     1510                                 │
└─────────────────────────────────────────────────────────────────────────┘
                                      │
                                      ▼
┌─────────────────────────────────────────────────────────────────────────┐
│ Display the effect of the first asset item being tried on the first body part of the first user │
│                             on the interface 1512                        │
└─────────────────────────────────────────────────────────────────────────┘
                                      │
                                      ▼
┌─────────────────────────────────────────────────────────────────────────┐
│ Receive the first asset item from the second user based on the effect and user input 1514 │
└─────────────────────────────────────────────────────────────────────────┘
                                      │
                                      ▼
┌─────────────────────────────────────────────────────────────────────────┐
│ Determine a second body part of the first user based on a selection of a representative of │
│              a second asset item associated with the second user 1516    │
└─────────────────────────────────────────────────────────────────────────┘
                                      │
                                      ▼
┌─────────────────────────────────────────────────────────────────────────┐
│   Display an effect of the second asset item being tried on the second body part of the │
│                                first user 1518                           │
└─────────────────────────────────────────────────────────────────────────┘
```

```
┌─────────────────────────────────────────────────────────────────────┐
│ Send a request by a first client computing device for connecting with a second client │
│                          computing device 1602                       │
└─────────────────────────────────────────────────────────────────────┘
                                    ▼
┌─────────────────────────────────────────────────────────────────────┐
│ Display a first video comprising a first user and a second video comprising a second │
│                          user on an interface 1604                   │
└─────────────────────────────────────────────────────────────────────┘
                                    ▼
┌─────────────────────────────────────────────────────────────────────┐
│ Display a plurality of representatives corresponding to a plurality of asset items │
│              associated with the first user on the interface 1606    │
└─────────────────────────────────────────────────────────────────────┘
                                    ▼
┌─────────────────────────────────────────────────────────────────────┐
│ In response to a selection of one of the plurality of representatives, sending a request │
│         for trying on a corresponding asset item by the second user 1608 │
└─────────────────────────────────────────────────────────────────────┘
                                    ▼
┌─────────────────────────────────────────────────────────────────────┐
│ Determine a body part of the second user in the second video based on a selection of │
│                  one of the plurality of representatives 1610        │
└─────────────────────────────────────────────────────────────────────┘
                                    ▼
┌─────────────────────────────────────────────────────────────────────┐
│ Render an image of the corresponding asset item and combining the image into the │
│                             second video 1612                        │
└─────────────────────────────────────────────────────────────────────┘
                                    ▼
┌─────────────────────────────────────────────────────────────────────┐
│ Display an effect of the corresponding asset item being tried on the body part of the │
│                             second user 1614                         │
└─────────────────────────────────────────────────────────────────────┘
                                    ▼
┌─────────────────────────────────────────────────────────────────────┐
│   Send the corresponding asset item to the second user based on the effect of the    │
│ corresponding asset item being tried on the body part of the second user and user input │
│                                 1616                                 │
└─────────────────────────────────────────────────────────────────────┘
```

FIG. 16

US 11,763,496 B2

SOCIAL NETWORKING BASED ON ASSET ITEMS

BACKGROUND

Communication is increasingly being conducted using Internet-based tools. The Internet-based tools may be any software or platform. Existing social media platforms, such as YouTube and Facebook, enable users to communicate with each other by sharing images, videos, and other information via static app or web pages. As communication devices, such as mobile phones, become more sophisticated, people continue to desire new ways for social networking and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 15 shows another example process for trading asset items in accordance with the present disclosure.

FIG. 16 shows another example process for trading asset items in accordance with the present disclosure.

DETAILED DESCRIPTION OF ILLUSTRATIVE EMBODIMENTS

Figure 1:
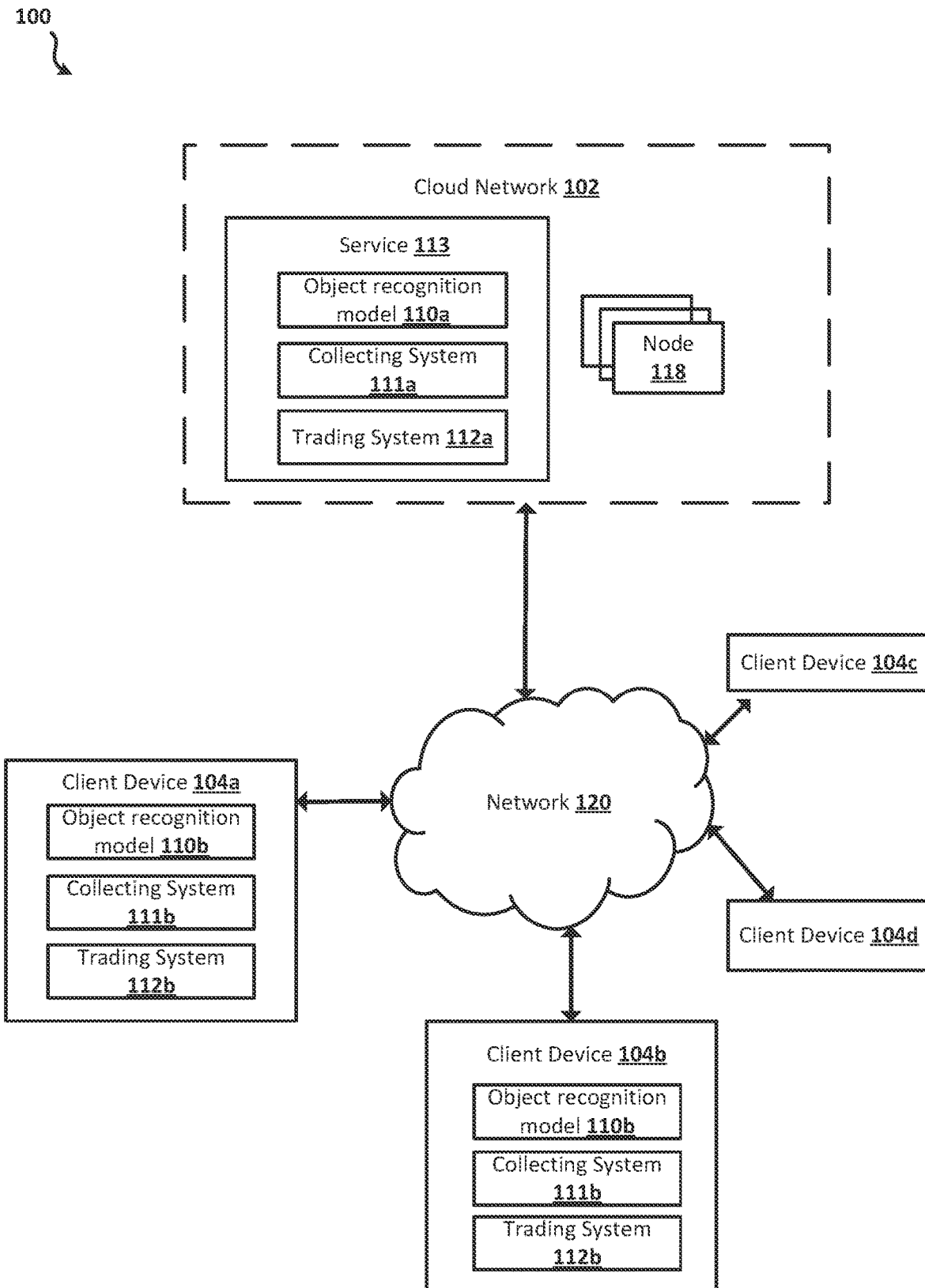
FIG. 1 shows an example system including a cloud service in accordance with the present disclosure.

Image recognition represents a set of methods for detecting and analyzing images to enable the automation of a specific task. It is a technology capable of identifying places, objects, people, and many other types of elements in images and drawing conclusions accordingly. Current image recognition systems may be able to identify objects, such as a landmark or a product, in an image.

Many current image recognition systems utilize only server-side recognition. In other words, a remote server (and not a client device, such as a mobile phone) is responsible for detecting and identifying places, people, or objects within images captured by a client device. However, such server-side systems may experience slow response times. For example, the client device may have to upload images to the server (e.g., cloud) before any detection or identification may be performed. The server may also have to process user data associated with the client device before the performing any image recognition techniques on the uploaded images. Accordingly, the systems that utilize server-side recognition do not provide the best user experience.

Some current image recognition systems utilize only client-side recognition. In these systems, the detection and identification of places, people, or objects within images captured by a client device is performed by the client device itself (and not a remote server). Such systems may provide faster response times than the server-side systems. For example, the client device no longer needs to upload images to a server and wait for the server to process the user data associated with the client device. However, these client-side systems also have downsides. For example, these client-side systems are much more limited in their computation and storage capabilities than a remote server (e.g., cloud) may be. As another example, it may be more difficult to modify or upgrade each individual client device than it is to modify or upgrade a central server.

Accordingly, an image recognition system that provides both server-side and client-side capabilities is desirable. Such a system is described herein. The image recognition system described herein provides the computation and storage benefits of the server-side systems as well as the efficiency of the client-side systems. In the image recognition system described herein, both the client(s) and the server share a single model production pipeline. Global features may be extracted from a single image of one place, person, or object. After these global features are extracted once, these pre-computed features may be indicated in a model file. This model file may be used by either the client device(s) or the server to perform image recognition tasks. By allowing the client device(s) and server to share a single model production pipeline, the image recognition system described herein experiences more flexibility than prior image recognition systems and provides the foundation for generalization recognition.

The image recognition system described herein utilizes deep learned features extracted from a deep learning model to recognize places, people, or objects within an image. Compared to existing image recognition systems, this deep learned feature extraction provides a huge efficiency improvement. For example, a 3D model does not need to be reconstructed for every new landmark. These global features may be used for recognition and/or as an augmented reality (AR) trigger. As a result, there may be no need for the detailed structure or geometric information associated with the place, person, or object, which likely demands 3D reconstruction from many more images.

Compared to traditional handcrafted feature (e.g., SIFT), these deep learned features have a more robust recognition capability under dramatic change of lighting, camera distance and angle. For example, the deep learning model may be trained using many millions of classified or annotated images of a place, person, or object under various lighting and viewing conditions. Accordingly, the produced model is able to grasp the distinct features of places, persons, or objects under similarly challenging situations. As a result, the image recognition system described herein has a robust recognition capability under dramatic change of lighting, camera distance and angle.

The image recognition system described herein may be utilized as part of a new social networking game. The new social networking game may empower users to collect, trade and/or use exclusive asset items, e.g., AR asset items. FIG. 1 illustrates an example system 100 that facilitates such a social networking game. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide service(s) via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a service 113. The service 113 may comprise a content streaming service, such as an Internet protocol video streaming service. The service 113 may be configured to distribute content via a variety of transmission techniques. The service 113 is configured to provide the content, such as video, audio, textual data, a combination thereof, and/or the like. The content may comprise content streams (e.g., video stream, audio stream, information stream), content files (e.g., video file, audio file, text file), and/or other data. The content may be stored in a database. For example, the service 113 may comprise a video sharing service, a video hosting platform, a content distribution platform, a collaborative gaming platform, and/or the like. The service 113 may comprise any other type of service in addition to, or instead of, a content streaming service.

In an embodiment, the service 113 may be provided to the client devices 104 via the network 120. If the service 113 is a content streaming service, content may be output to different client devices 104 via the network 120. The content may be streamed to the client devices 104. The content stream may be a stream of short videos received from the service 113. The plurality of client devices 104 may be configured to access the content from the service 113. In an embodiment, a client device 104 may comprise an application. The application outputs (e.g., display, render, present) the content to a user associated with the client device 104. The content may comprise videos, audio, comments, textual data and/or the like.

In an embodiment, a user may use the application on a client device 104 to create content and upload the short video to the cloud network 102. The client devices 104 may access an interface of the application. The interface may comprise an input element. For example, the input element may be configured to allow users to create the content. To create the content, the user may give the application permission to access an image capture device, such as a camera, or a microphone of the client device 104. After the user has created the content, the user may use the application to upload the content to the cloud network 102 and/or to save the content locally to the user device 104. The service 113 may store the uploaded content and any metadata associated with the content in one or more databases.

In an embodiment, the service 113 and at least one of the client devices 104a-d comprise an object recognition model 110a-b. The object recognition model 110 may be utilized by a collecting system 111 and/or a trading system 112. The collecting system 111 may enable users of the client devices 104a-d to collect AR items. The collecting system 111 may be configured to perform image recognition tasks with respect to images received from/captured by client devices 104a-d. For example, the collecting system 111 may be configured to identify places, objects, and/or people in images received from/captured by client devices 104a-d.

The server-side collecting system 111a may be configured to receive, from a client device 104a-d, an image depicting a place, person, or object (or a portion of place, person, or object). For example, a user associated with a client device 104a-d, may capture an image using a camera of a client device 104a-d. Capturing an image may include, for example, taking an actual photo and/or merely pointing the camera of the client device 104a-d at a place, person, or object of interest. The image may be sent from the client device to a generic recognition interface of the server-side collecting system 111a. The recognition interface may send/forward the query image to a cloud instance recognition feature extraction (IRFE) of the server-side collecting system 111a. The IRFE may extract global features from the image. Different learning-based network models for different application domains (such as landmarks, products/items, food/drinks, people, places, etc.) may be plugged into the IRFE, and the IRFE may produce global feature descriptors through network inference, given database image(s) for certain instance as inputs.

An AR model management system (ARMS) of the server-side collecting system 111a may store a plurality of model files. Each of the plurality of model files correspond to a particular known image of a plurality of known images. Each of the plurality of model files may indicate model features associated with the corresponding known image. To generate the model files, extracted global features may be packed into a model file format by a model production component of the server-side collecting system 111a. The model file format may be any format that the recognition algorithm can understand. For example, the model production component may combine algorithm or application related parameters and convert them into a model file format. The model product component may forward or send the generated models to the ARMS. The ARMS may be configured to manage the storage for AR recognition models for both client and server usages. For example, the model files stored in the ARMS may be accessible/usable to both the server and the client.

Figure 2:
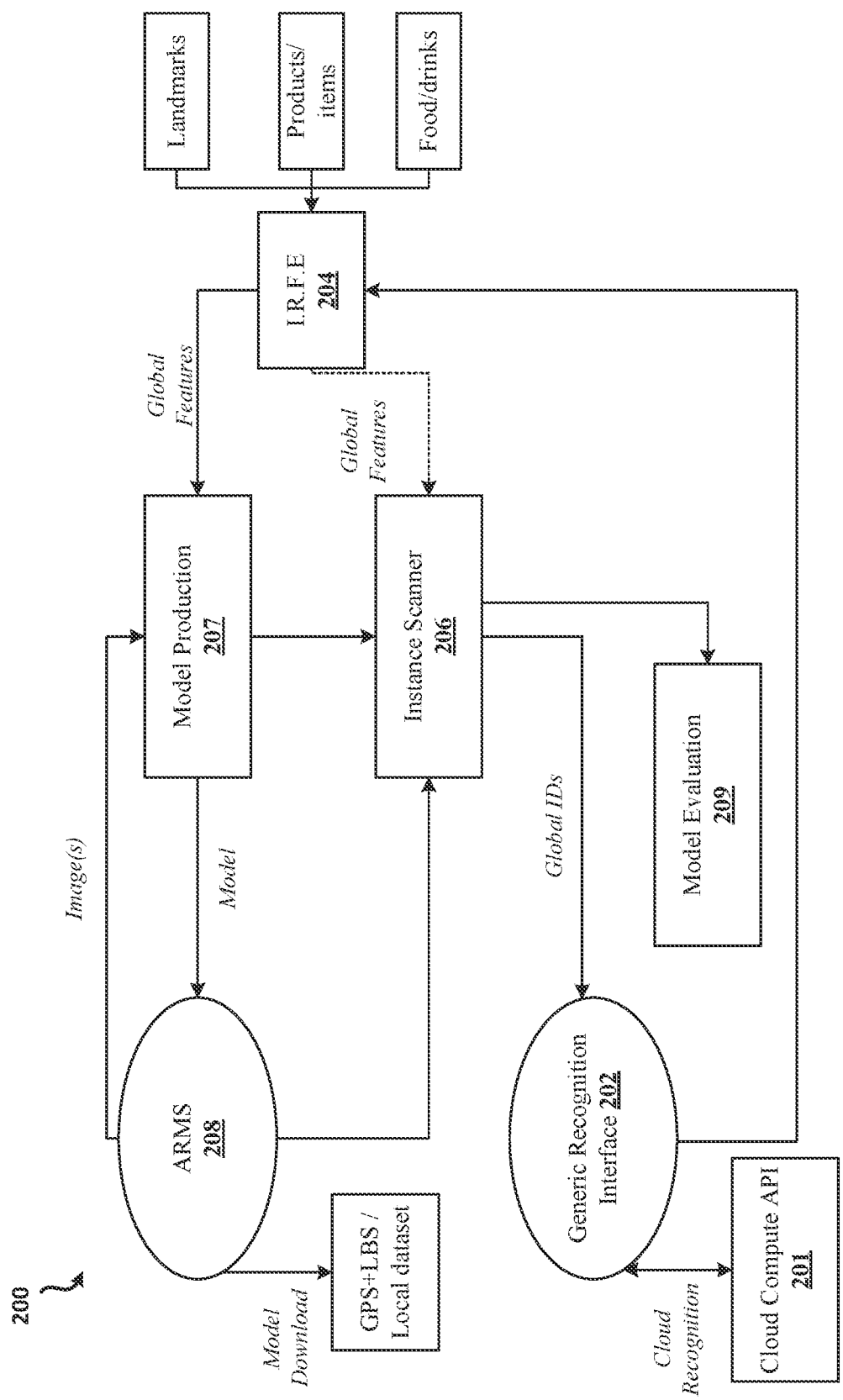
FIG. 2 shows an example framework for an asset collecting system in accordance with the present disclosure.

The extracted global query features may be sent or transferred from the IRFE to an instance scanner of the server-side collecting system 111a. The instance scanner may obtain the relevant model feature(s) from the ARMS. For example, the instance scanner may receive the global feature descriptor of a query image as input and may efficiently go through a list of global features associated with a number of database instances to determine which one (if any) is similar or most similar. The instance scanner may compute a recognition result associated with the image based on the global query features and the model features obtained from the ARMS. The instance scanner may send or forward the recognized global identification (ID) back to the recognition interface. The recognition interface may then transmit the result ID to the client side (such as the client device from which the image was received). An exemplary framework for the server-side collecting system 111*a* is illustrated in FIG. 2.

The client-side collecting system 111*b* may be in communication with, or work in conjunction with, the collecting system 111*a*. A GPS+LBS/local dataset of the client-side collecting system 111*b* may provide a location reading (GPS reading) to the ARMS of the collecting system 111*a* to download relevant model files from the server/cloud to the client device. For example, the relevant model files may be those models associated with landmarks near the client device's current location or location at the time an image was taken (based on GPS). Alternatively, there may be a location-based service (LBS) local system to select the most relevant models, such as those based on the client device's current location or location at the time an image was taken. For example, the client device may have a list of recognition models in its local storage or cache, and/or may be able to load a subset of models based on current location.

Figure 4:
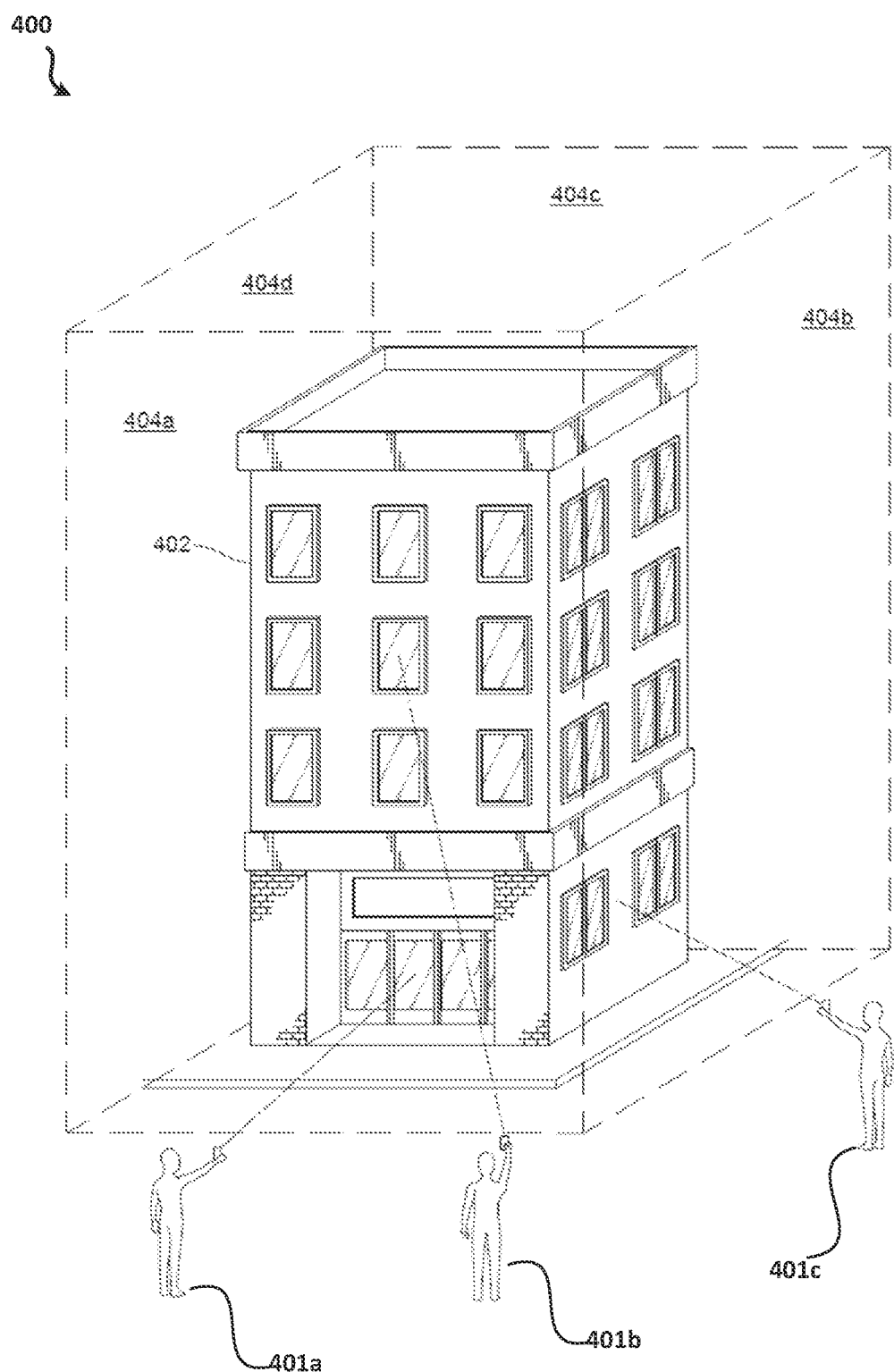
FIG. 4 shows an example object of which images being captured by client devices in accordance with the present disclosure.

The model/features may be forwarded to a mobile SDK/API of the client-side collecting system 111*b*. The SDK/API may serve a similar purpose as the instance scanner of the server-side collecting system 111*a*. A camera of the client-side collecting system 111*b* may capture one query image (e.g., frame) through an effect engine of the client-side collecting system 111*b*. FIG. 4, discussed below in more detail, shows an image being captured by the camera through the effect engine. The effect engine may forward the query image or frame to the mobile SDK 304. In an embodiment, a continuous sequence of query pictures may be obtained from a camera feed and sent or forwarded to the SDK/API based on mobile computation capability. Some of them may be forwarded to a mobile IRFE of the client-side collecting system 111*b* in order to obtain global features.

The mobile IRFE may compute features based on one or more query frames. The mobile IRFE may serve a similar purpose as its cloud counterpart (e.g., the IRFE of the server-side collecting system 111*a*) but may be based on a neural network platform dedicated for mobile compute, and much smaller network models tailored for mobile storage. The query features may be sent or transferred from the mobile IRFE to the SDK/API. The mobile SDK/API may compare the query feature with the model feature and return a recognition result to the effect engine. If one or more of the query images/frames contain a known place, person, or object in the database (even if the image of the place, person, or object might be captured under different viewpoint/lighting conditions than the image in the database) through scanner logic the SDK/API can figure out the corresponding instance ID. This instance ID may be used to trigger corresponding effects.

Figure 3:
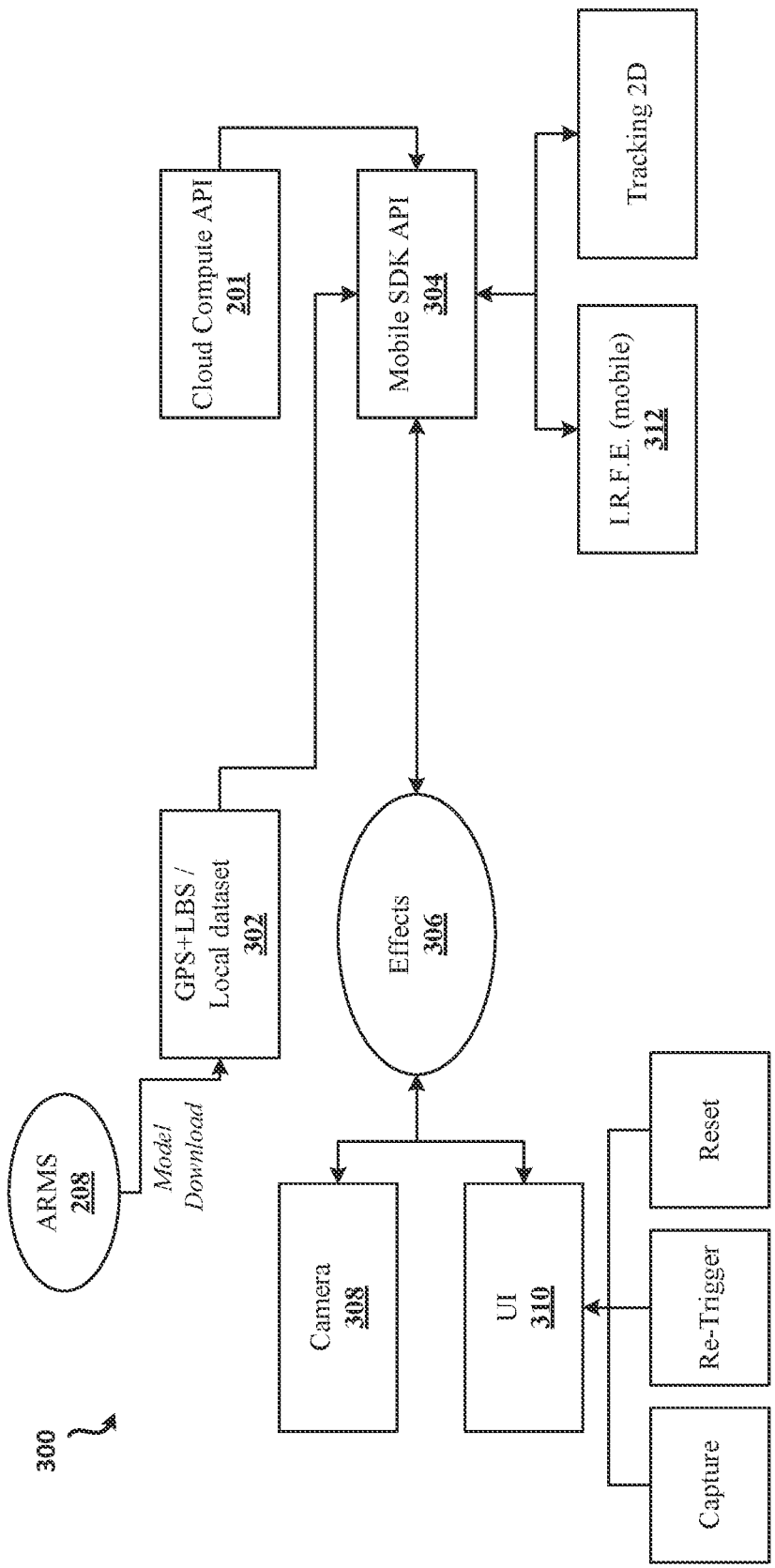
FIG. 3 shows another example framework for an asset collecting system in accordance with the present disclosure.

The framework of the client-side collecting system 111*b* differs from the framework of the server-side collecting system 111*a* in that the framework of the server-side collecting system 111*a* offloads the IRFE function and the instance scanner function to cloud servers. Accordingly, the framework of the server-side collecting system 111*a* is less restricted in terms of recognition model size and/or the scale of scannable instance candidates. Given a continuous internet connection and/or proper user authorization, some client device camera feeds may be uploaded to backend servers (e.g., server-side collecting system 111*a*) in order to obtain recognized instance IDs through the generic recognition interface. The client device waiting time for each result return may vary, such as depending on network conditions. An exemplary framework for the client-side collecting system 111*b* is illustrated in FIG. 3.

The server-side collecting system 111*a* provides server-side image recognition utilizing the server-side recognition model 110*a* and the client-side collecting system 111*b* provides client-side image recognition utilizing the server-side recognition model 110*b*. As discussed above, an image recognition system that provides both server-side and client-side capabilities is desirable. Accordingly, the system described above (e.g., system 100) is desirable as it provides the computation and storage benefits of the server-side systems as well as the efficiency of the client-side systems. In the system described above, both the client(s) and the server share a single model production pipeline. Global features may be extracted from a single image of one place, person, or object. After these global features are extracted once, these pre-computed features may be indicated in a model file. This model file may be used by either the client device(s) or the server to perform image recognition tasks. By allowing the client device(s) and server to share a single model production pipeline, the image recognition system described herein experiences more flexibility than prior image recognition systems and provides the foundation for generalization recognition.

The system described above utilizes deep learned features extracted from a deep learning model to recognize places, people, or objects within an image. Compared to existing image recognition systems, this deep learned feature extraction provides a huge efficiency improvement. For example, a 3D model does not need to be reconstructed for every new landmark. These global features may be used for recognition and/or as an augmented reality (AR) trigger. As a result, there may be no need for the detailed structure or geometric information associated with the place, person, or object, which likely demands 3D reconstruction from many more images.

Compared to traditional handcrafted feature (e.g., SIFT), these deep learned features have a more robust recognition capability under dramatic change of lighting, camera distance and angle. For example, the deep learning model may be trained using many millions of classified or annotated images of a place, person, or object under various lighting and viewing conditions. Accordingly, the produced model is able to grasp the distinct features of places, persons, or objects under similarly challenging situations. As a result, the image recognition system described above has a robust recognition capability under dramatic change of lighting, camera distance and angle.

Once an object in an image has been identified using the client-side collecting system 111*b* and/or server-side collecting system 111*a*, the user of the client device may receive a token (e.g., prize, item, asset, etc.) associated with the identified object of interest. For example, if the object of interest is identified as the Eiffel Tower (e.g., a landmark), the user of the client device may receive a token associated with the Eiffel tower. The token may be, for example, an article of clothing (shirt, jacket, pants, etc.), an accessory (sunglasses, hat, purse, etc.), or another object such as a mask, a food item, an animal, etc. If the object of interest is identified as the Eiffel Tower, the token may be, for example, something that is traditionally associated with French culture (e.g., a beret, a croissant, a baguette, etc.).

Figure 5:
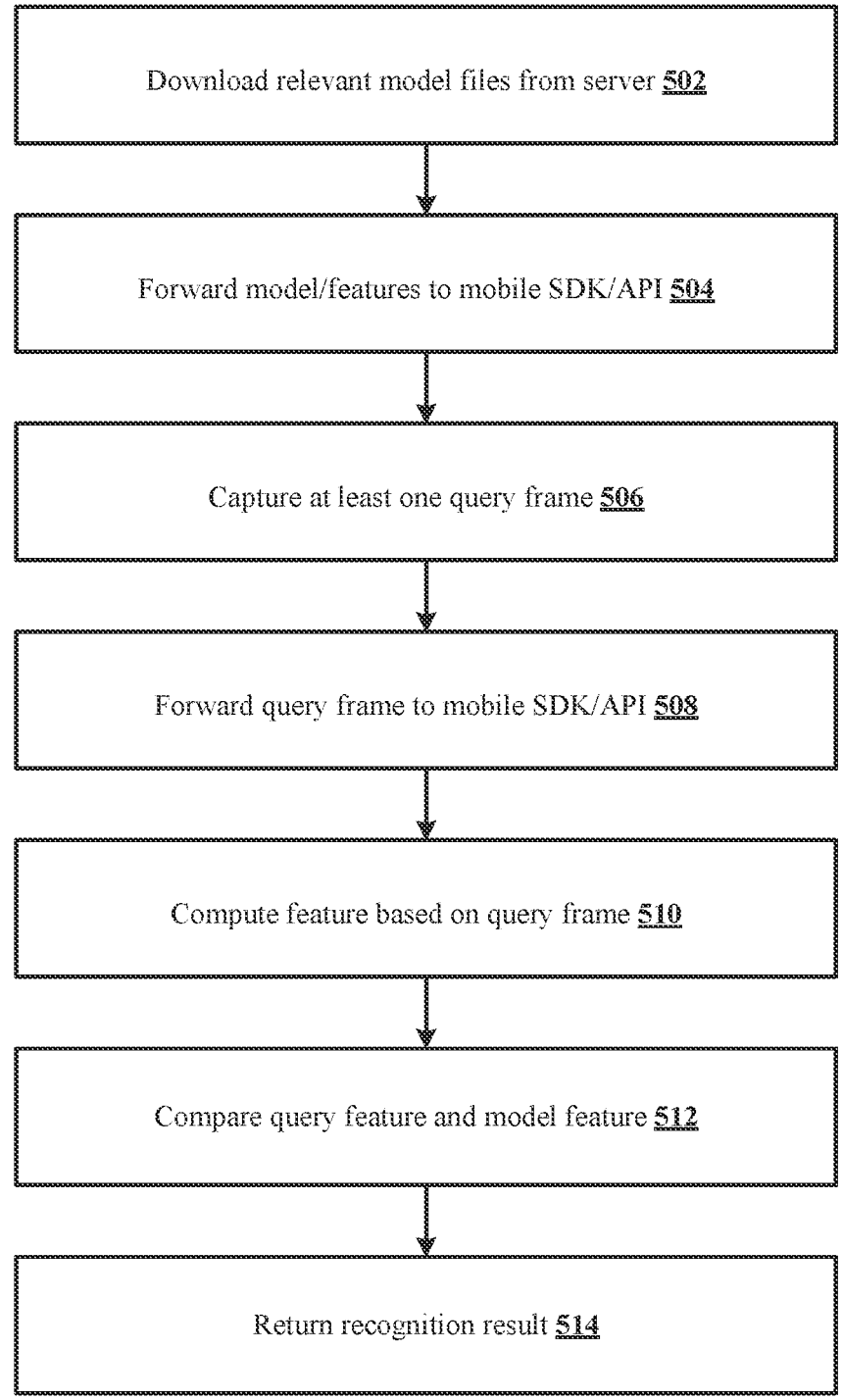
FIG. 5 shows an example process for collecting asset items in accordance with the present disclosure.
Figure 6:
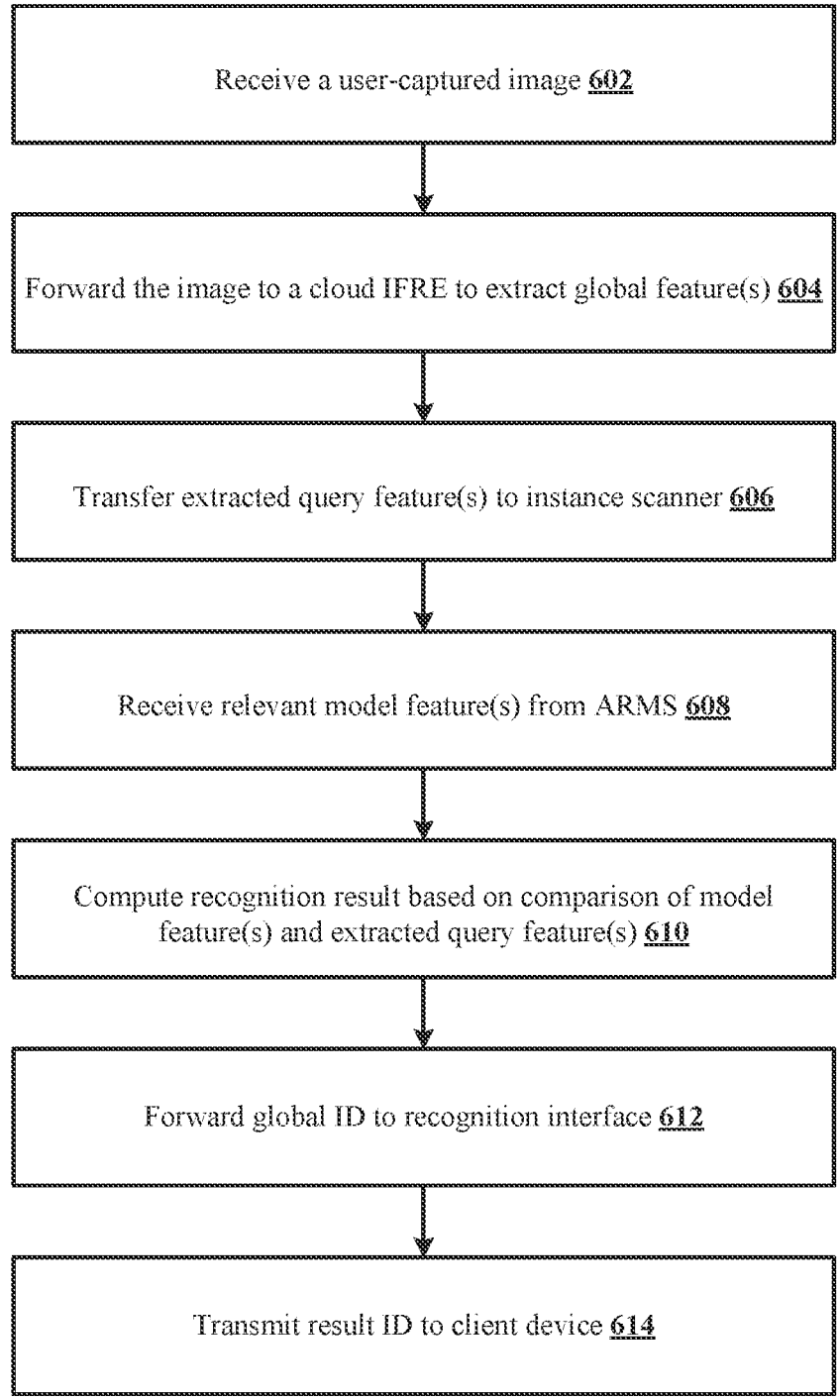
FIG. 6 shows another example process of collecting asset items in accordance with the present disclosure.

A user may collect a plurality of tokens. The user may be incentivized to visit a plurality of different locations or search for a plurality of different objects in order to collect different tokens. Some tokens may be "rare," or more difficult to find than other tokens. A user may be able to swap or trade his or her tokens with the tokens of a different user. For example, a first user may want a rare token that a second user has. The first user may be able to trade one of his or her tokens with the second user in order to acquire the rare token. The trading system 112a and/or the trading system 112b may facilitate such trading. An exemplary framework for the server-side trading system 112a is illustrated in FIG. 5. An exemplary framework for the client-side trading system 112b is illustrated in FIG. 6.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The plurality of computing nodes 118 may process tasks associated with the service 113. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

FIG. 2 shows an example framework 200 for a server-side collecting system, such as the collecting system 111a of FIG. 1. The server-side collecting system may be in communication with, or work in conjunction with, a client-side collecting system, such as the collecting system 111b of FIG. 1. A user, such as a user associated with a client device 104a-d, may capture an image using a camera of a client device 104a-d. Capturing an image may include, for example, taking an actual photo and/or merely pointing the camera of the client device 104a-d at a place, person, or object of interest. The image may be sent from the client device 104a-d to a cloud compute API 201. The cloud compute API 201 may send the image to a generic recognition interface 202 of the server. The generic recognition interface 202 may handle a plurality of tasks. For example, the generic recognition interface 202 may abstract various downstream recognition algorithms including, but not limited to, learning based instance recognition (instanceAR). As another example, the generic recognition interface 202 may manage a global space for instance IDs which will be shared amongst all recognition algorithms.

The recognition interface 202 may send/forward the query image to a cloud instance recognition feature extraction 204 (IRFE). The IRFE 204 may extract global features from the image. Different learning-based network models for different application domains (such as landmarks, products/items, food/drinks, people, places, etc.) may be plugged into the IRFE 204, and the IRFE 204 may produce global feature descriptors through network inference, given database image(s) for certain instance as inputs.

An AR model management system (ARMS) 208 may store a plurality of model files. Each of the plurality of model files correspond to a particular known image of a plurality of known images. Each of the plurality of model files may indicate model features associated with the corresponding known image. To generate the model files, extracted global features may be packed into a model file format by a model production component 207. The model file format may be any format that the recognition algorithm can understand. For example, the model production component 207 may combine algorithm or application related parameters and convert them into a model file format. The model product component 207 may forward or send the generated models to the ARM 208. The ARMS 208 may be configured to manage the storage for AR recognition models for both client and server usages. For example, the model files stored in the ARMS 208 may be accessible/usable to both the server and the client.

The extracted global query features may be sent or transferred from the IRFE 204 to an instance scanner 206. The instance scanner 206 may obtain the relevant model feature(s) from the ARMS 208. For example, the instance scanner 206 may receive the global feature descriptor of a query image as input and may efficiently go through a list of global features associated with a number of database instances to determine which one (if any) is similar or most similar. The instance scanner 206 may compute a recognition result associated with the image based on the global query features and the model features obtained from the ARMS 208. The instance scanner 206 may send or forward the recognized global identification (ID) back to the recognition interface 202. The recognition interface 202 may then transmit the result ID to the client side (such as the client device from which the image was received).

In an embodiment, the framework 200 includes a model evaluation component 209. The model evaluation component 209 may be used to verify the effectiveness of the produced model. For example, the model evaluation component 209 may use an evaluation dataset to simulate model queries and gather responses. Given recognition models and a number of query images with known ground truth (e.g., an expected recognition result), the evaluation component 209 will call the instance scanner 206, compare the outputs with the expected truth, and produce a model evaluation conclusion. Once this test is passed (e.g., effectiveness of model is verified), the produced model is ready for use or application. The model file(s) will be stored and managed by the ARMS 208.

FIG. 3 shows an example framework 300 for a client-side collecting system, such as the collecting system 111b of FIG. 1. The client-side collecting system may be in communication with, or work in conjunction with, a server-side collecting system, such as the collecting system 111a of FIG. 1.

A GPS+LBS/local dataset 302 may provide a location reading (GPS reading) to the ARMS 208 to download relevant model files from the server/cloud to the client device. For example, the relevant model files may be those models associated with landmarks near the client device's current location or location at the time an image was taken (based on GPS). Alternatively, there may be a location-based service (LBS) local system to select the most relevant models, such as those based on the client device's current location or location at the time an image was taken. For example, the client device may have a list of recognition models in its local storage or cache, and/or may be able to load a subset of models based on current location.

The model/features may be forwarded to a mobile SDK/API 304. The SDK/API 304 may serve a similar purpose as the instance scanner 206 described above with respect to FIG. 2. For example, other than interfacing with an effect engine 306 on a client device (which is interfacing with a camera 308 and a UI 310), the mobile SDK/API 304 serves a similar purpose as the instance scanner 206 on the cloud. The camera 308 may capture one query image (e.g., frame) through the effect engine 306. FIG. 4, discussed below in more detail, shows an image being captured by the camera 308 through the effect engine 306. The effect engine 306 may forward the query image or frame to the mobile SDK 304. In an embodiment, a continuous sequence of query pictures may be obtained from a camera feed and sent or forwarded to the SDK/API 304 based on mobile computation capability. Some of them may be forwarded to a mobile IRFE 312 in order to obtain global features.

The mobile IRFE 312 may compute feature features based on one or more query frames. The mobile IRFE 312 may serve a similar purpose as its cloud counterpart (e.g., IRFE 204), but may be based on a neural network platform dedicated for mobile compute, and much smaller network models tailored for mobile storage. The query features may be sent or transferred from the IRFE 312 to the SDK/API 304. The mobile SDK/API 304 may compare the query feature with the model feature and return a recognition result to the effect engine 306. If one or more of the query images/frames contain a known place, person, or object in the database (even if the image of the place, person, or object might be captured under different viewpoint/lighting conditions than the image in the database) through scanner logic the SDK/API 304 can figure out the corresponding instance ID. This instance ID may be used to trigger corresponding effects.

The framework 300 differs from the framework 200 in that the framework 200 offloads the IRFE function and the instance scanner function to cloud servers. Accordingly, the framework 200 is less restricted in terms of recognition model size and/or the scale of scannable instance candidates. Given a continuous internet connection and/or proper user authorization, some client device camera feeds may be uploaded to backend servers (e.g., framework 200) in order to obtain recognized instance IDs through the generic recognition interface 202. The client device waiting time for each result return may vary, such as depending on network conditions.

The framework 200 provides server-side image recognition via the server-side recognition model 110a and the framework 300 provides client-side image recognition via the client-side recognition model 110b. As discussed above, an image recognition system that provides both server-side and client-side capabilities is desirable. Accordingly, the system described above (e.g., system 100) is desirable as it provides the computation and storage benefits of the server-side systems as well as the efficiency of the client-side systems. In the system described above, both the client(s) and the server share a single model production pipeline. Global features may be extracted from a single image of one place, person, or object. After these global features are extracted once, these pre-computed features may be indicated in a model file. This model file may be used by either the client device(s) or the server to perform image recognition tasks. By allowing the client device(s) and server to share a single model production pipeline, the image recognition system described herein experiences more flexibility than prior image recognition systems and provides the foundation for generalization recognition.

The system described above utilizes deep learned features extracted from a deep learning model to recognize places, people, or objects within an image. Compared to existing image recognition systems, this deep learned feature extraction provides a huge efficiency improvement. For example, a 3D model does not need to be reconstructed for every new landmark. These global features may be used for recognition and/or as an augmented reality (AR) trigger. As a result, there may be no need for the detailed structure or geometric information associated with the place, person, or object, which likely demands 3D reconstruction from many more images.

Compared to traditional handcrafted feature (e.g., SIFT), these deep learned features have a more robust recognition capability under dramatic change of lighting, camera distance and angle. For example, the deep learning model may be trained using many millions of classified or annotated images of a place, person, or object under various lighting and viewing conditions. Accordingly, the produced model is able to grasp the distinct features of places, persons, or objects under similarly challenging situations. As a result, the image recognition system described above has a robust recognition capability under dramatic change of lighting, camera distance and angle.

FIG. 4 shows an image of an object (e.g., landmark) being captured by a camera (e.g., camera 308) of a client device, such as a client device 104-d. In an embodiment, when the camera captures an image of the object 402, the camera of the client device may be positioned relative to one of four planes that are positioned around the object: 404a, 404b, 404c, or 404d. The camera of the client device may have a variety of different lines of sight to the object 402 and may detect the object 402 from these different lines of sight. For example, FIG. 4 illustrates a scenario where the cameras of two client devices are each positioned so that they are on a side opposite the plane 404a relative to the object. The cameras of the two client devices positioned so that they are on a side opposite the plane 404a relative to the object have two different lines of sight to the object 402. FIG. 4 also illustrates a scenario where the camera of a client device is positioned so that it is on a side opposite the plane 404b.

The planes merely represent a mathematical construct that is calculated relative to the object. When the camera is positioned on a side opposite the plane 404a relative to the object, the camera may be directed toward a first portion of the object. When the camera is positioned on a side opposite one of the other planes 404b-d, the camera may be directed towards different portions of the object, such as different sides of the landmark or building.

In another embodiment, when the object tracking model detects the object 402, the camera of the client device may be positioned relative to a construct in the form of a cylinder (not planes) that is positioned around the object 402, i.e., a product or a landmark. The cylinder may be a right cylinder or an oblique cylinder. The bases of the cylinder may or may not be circles. When the camera is positioned on a side opposite the cylinder relative to the object 402, the camera may be directed toward a first portion of the object 402. Other structures are also contemplated, such as a structure having sides arranged in a hexagonal fashion or any other arbitrary geometric meshes.

As described above, compared to traditional handcrafted feature (e.g., SIFT), the deep learned features utilized by the object recognition models 110*a-b* have a more robust recognition capability under dramatic change of lighting, camera distance and angle. For example, the deep learning model may be trained using many millions of classified or annotated images of a place, person, or object under various lighting and viewing conditions. Accordingly, the produced model is able to grasp the distinct features of places, persons, or objects under similarly challenging situations. As a result, the object recognition models 110*a-b* described herein has a robust recognition capability under dramatic change of lighting, camera distance and angle. For example, the object recognition models 110*a-b* may be able to identify the object 402 in an image of the object 402 regardless of the angle, lighting, or camera distance in the image. As a result, the object recognition models 110*a-b* may be able to identify the object 402 in the images taken by each of the users 401*a-c*, even though the users 401*a-c* are all capturing an image of the object 402 from different angles and positions.

As described above, a user of a client device (e.g., client device 104*a-d*) may capturing an image of a place, person, or object of interest. Capturing the image may include, for example, taking an actual photo of the object of interest and/or merely pointing the camera of the client device 104*a-d* at a place, person, or object of interest. The object of interest may be identified using an object recognition model, such as one of client-side object recognition model 110*b* and/or server-side object recognition model 110*a*. For example, the object of interest may be identified using the collector model 111*a* that utilizes the server-side object recognition model 110*a* and/or the collector model 112*b* that utilizes the client-side object recognition model 110*b*.

Once the object of interest is identified, the user of the client device may receive a token (e.g., prize, item, asset, etc.) associated with the identified object of interest. For example, if the object of interest is identified as the Eiffel Tower (e.g., a landmark), the user of the client device may receive a token associated with the Eiffel tower. The token may be, for example, an article of clothing (shirt, jacket, pants, etc.), an accessory (sunglasses, hat, purse, etc.), or another object such as a mask, a food item, an animal, etc. If the object of interest is identified as the Eiffel Tower, the token may be, for example, something that is traditionally associated with French culture (e.g., a beret, a croissant, a baguette, etc.).

A user may collect a plurality of tokens. The user may be incentivized to visit a plurality of different locations or search for a plurality of different objects in order to collect different tokens. Some tokens may be "rare," or more difficult to find than other tokens. A user may be able to swap or trade his or her tokens with the tokens of a different user. For example, a first user may want a rare token that a second user has. The first user may be able to trade one of his or her tokens with the second user in order to acquire the rare token. The trading system 112*a* and/or the trading system 112*b* may facilitate such trading.

FIG. 5 shows an example client-side process 500 for collecting. The process 500 may be performed, for example, by a client-side collecting system (e.g., the collecting system 111*b* of FIG. 1). As described above, the collecting system 111*b* may utilize the framework 300 of FIG. 3. Although depicted as a sequence of operations in FIG. 5, those of ordinary skill in the art will appreciate that various embodiments may add, remove, reorder, or modify the depicted operations.

The client-side collecting system may be in communication with, or work in conjunction with, a server-side collecting system, such as the collecting system 111*a* of FIG. 1.

A GPS+LBS/local dataset (e.g., GPS+LBS/local dataset 302) may provide a location reading (GPS reading) to an AR model management system (e.g., the ARMS 208) to download relevant model files from the server/cloud to the client device. At 502, relevant model files may be downloaded from the server. For example, the relevant model files may be those models associated with landmarks near the client device's current location or location at the time an image was taken (based on GPS). Alternatively, there may be a location-based service (LBS) local system to select the most relevant models, such as those based on the client device's current location or location at the time an image was taken. For example, the client device may have a list of recognition models in its local storage or cache, and/or may be able to load a subset of models based on current location.

At 504, the model/features may be forwarded to a mobile SDK/API (e.g., mobile SDK/API 304). The SDK/API may serve a similar purpose as the instance scanner 206 described above with respect to FIG. 2. For example, other than interfacing with an effect engine (e.g., effect engine 306) on a client device (which is interfacing with a camera, such as the camera 308, and a UI, such as the UI 310), the mobile SDK/API serves a similar purpose as the instance scanner 206 on the cloud.

At 506, at least one query image/frame may be captured. The camera may capture one query image (e.g., frame) through the effect engine. FIG. 4, discussed above, shows an image being captured by the camera through the effect engine. At 508, the query image may be forwarded to the mobile SDK/API. For example, the effect engine may forward the query image or frame to the mobile SDK. In an embodiment, a continuous sequence of query pictures may be obtained from a camera feed and sent or forwarded to the SDK/API based on mobile computation capability. Some of them may be forwarded to a mobile IRFE (e.g., the IRFE 312) in order to obtain global features.

At 510, one or more features may be computed based on the one or more query frames. For example, the mobile IRFE may compute features based on one or more query frames. The mobile IRFE may serve a similar purpose as its cloud counterpart (e.g., IRFE 204), but may be based on a neural network platform dedicated for mobile compute, and much smaller network models tailored for mobile storage. The query features may be sent or transferred from the IRFE to the mobile SDK/API.

At 512, the query feature(s) may be compared to the model feature(s). For example, the mobile SDK/API may compare the query feature with the model feature. The comparison may be used to identify (e.g., recognize) an object of interest in the query image. At 514, a recognition result indicative of the identification may be returned. For example, the mobile SDK/API may return a recognition result to the effect engine. If one or more of the query images/frames contain a known place, person, or object in the database (even if the image of the place, person, or object might be captured under different viewpoint/lighting conditions than the image in the database) through scanner logic the SDK/API can figure out the corresponding instance ID. This instance ID may be used to trigger corresponding effects.

FIG. 6 shows an example server-side process 600 for collecting. The process 600 may be performed, for example, by a server-side collecting system (e.g., the collecting system 111*a* of FIG. 1). As described above, the collecting system 111*a* may utilize the framework 200 of FIG. 2. Although depicted as a sequence of operations in FIG. 6, those of ordinary skill in the art will appreciate that various embodiments may add, remove, reorder, or modify the depicted operations.

The server-side collecting system may be in communication with, or work in conjunction with, a client-side collecting system, such as the collecting system 111b of FIG. 1. A user, such as a user associated with a client device, may capture an image using a camera of the client device (e.g., client device 104a-d). Capturing an image may include, for example, taking an actual photo and/or merely pointing the camera of the client device at a place, person, or object of interest. The image may be sent from the client device to a cloud compute API (e.g., cloud compute API 201).

At 602, the captured image may be received. For example, the captured image may be received by the cloud compute API. The cloud compute API may send the image to a generic recognition interface (e.g., generic recognition interface 202) of the server. The generic recognition interface may handle a plurality of tasks. For example, the generic recognition interface may abstract various downstream recognition algorithms including, but not limited to, learning based instance recognition (instanceAR). As another example, the generic recognition interface may manage a global space for instance IDs which will be shared amongst all recognition algorithms.

At 604, the image may be forwarded or sent to a cloud IFRE to extract global feature(s). For example, the recognition interface may send/forward the query image to the IRFE 204. The IRFE may extract global features from the image. Different learning-based network models for different application domains (such as landmarks, products/items, food/drinks, people, places, etc.) may be plugged into the IRFE, and the IRFE may produce global feature descriptors through network inference, given database image(s) for certain instance as inputs.

The extracted global features may be packed into a model file format by a model production component (e.g., model production component 207). The model file format may be any format that the recognition algorithm can understand. For example, the model production component may combine algorithm or application related parameters and convert them into a model file format. The model product component may forward or send the generated models to an AR model management system (ARMS), (e.g., ARMS 208). The ARMS may be configured to manage the storage for AR recognition models for both client and server usages.

At 606, the extracted global query features may be transferred to an instance scanner (e.g., instance scanner 206). The extracted global query features may be sent or transferred from the IRFE to the instance scanner. At 608, relevant model feature(s) from ARMS may be received. For example, the instance scanner may obtain the relevant model feature(s) from the ARMS. For example, the instance scanner may receive the global feature descriptor of a query image as input and may efficiently go through a list of global features associated with a number of database instances to determine which one (if any) is similar or most similar.

At 610, a recognition result may be computed based on comparison of model feature(s) and extracted query feature(s). The instance scanner may compute a recognition result associated with the image based on the global query features and the model features obtained from the ARMS. At 612, the global ID may be forwarded to the recognition interface. The instance scanner may send or forward the recognized global identification (ID) back to the recognition interface. At 614, the result ID may be transmitted to the client device. For example, the recognition interface may transmit the result ID to the client side (such as the client device from which the image was received).

In an embodiment, a model evaluation component (e.g., model evaluation component 209) may be utilized. The model evaluation component may be used to verify the effectiveness of the produced model. For example, the model evaluation component may use an evaluation dataset to simulate model queries and gather responses. Given recognition models and a number of query images with known ground truth (e.g., an expected recognition result), the evaluation component will call the instance scanner, compare the outputs with the expected truth, and produce a model evaluation conclusion. Once this test is passed (e.g., effectiveness of model is verified), the produced model is ready for use or application. The model file(s) will be stored and managed by the ARMS.

Figure 7:
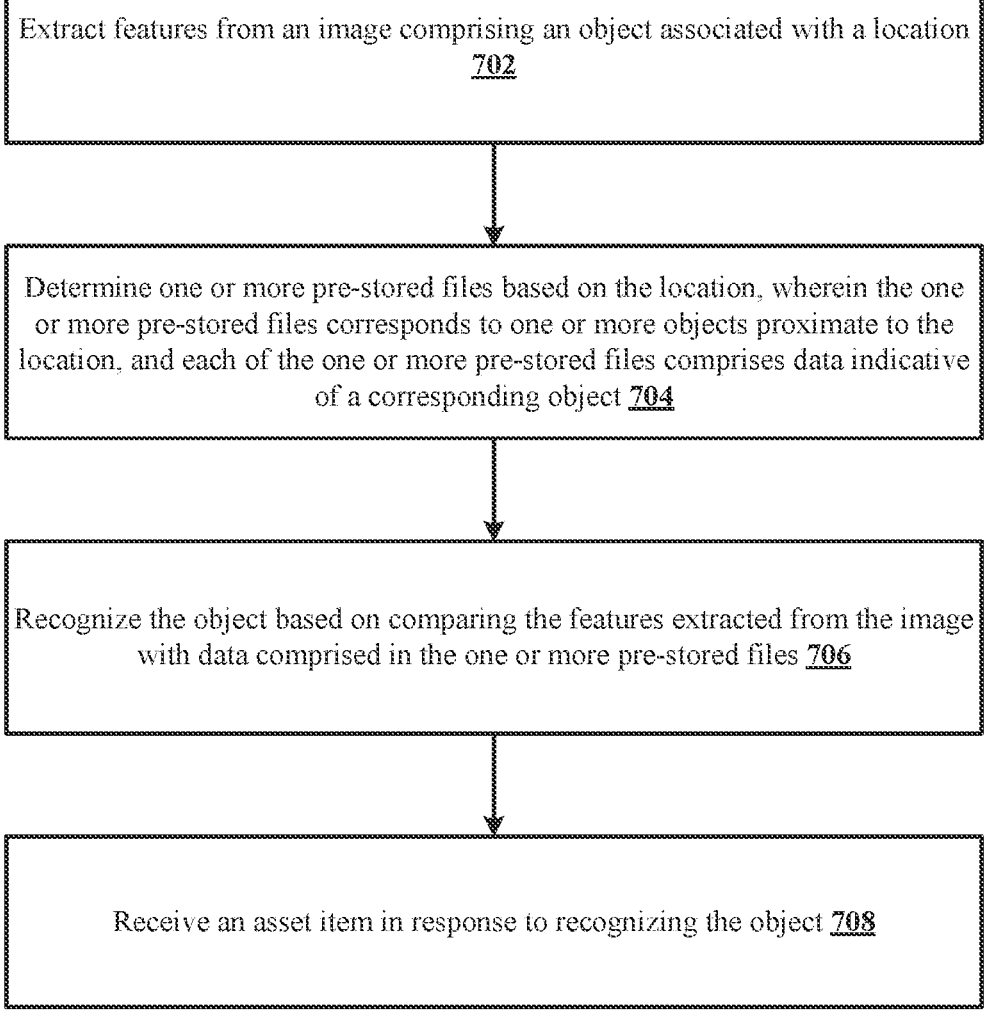
FIG. 7 shows another example process for collecting asset items in accordance with the present disclosure.

FIG. 7 shows an example client-side process 700 for collecting. The process 700 may be performed, for example, by a client-side collecting system (e.g., the collecting system 111b of FIG. 1). As described above, the collecting system 111b may utilize the framework 300 of FIG. 3. Although depicted as a sequence of operations in FIG. 7, those of ordinary skill in the art will appreciate that various embodiments may add, remove, reorder, or modify the depicted operations.

A user may capture an image via a client device. For example, an image and/or a series of images may be captured via a camera of the client device. In an embodiment, a continuous sequence of query pictures may be obtained from a camera feed and sent or forwarded to a mobile SDK/API (e.g., SDK/API 304) based on mobile computation capability. Some or all of the images may be forwarded to a mobile IRFE (e.g., mobile IRFE 312) in order to obtain global features associated with the image(s).

At 702, features may be extracted from an image. The image may depict an object, such as an object associated with a location. For example, global features may be extracted from the image. The feature extraction may be performed, for example, by the mobile IRFE. The mobile IRFE may compute features based on one or more query frames. The mobile IRFE may serve a similar purpose as its cloud counterpart (e.g., IRFE 204), but may be based on a neural network platform dedicated for mobile compute, and much smaller network models tailored for mobile storage.

The features extracted from the image may be compared with features indicated by one or more pre-stored files. At 704, one or more pre-stored filed may be determined based on the location associated with the image. The one or more pre-stored files may each correspond to one or more objects proximate to the location. For example, if the image is associated with a particular park located in a particular city, the one or more pre-stored files may each correspond to one or more people, places, objects, landmarks, etc. proximate to that park in that city. Each of the one or more pre-stored files may comprise data indicative of a corresponding object. For example, each of the one or more pre-stored files may comprise data indicative of model features associated with the corresponding object.

At 706, the object depicted by the image may be recognized. The object may be recognized based on comparing the features extracted from the image with data comprised in the one or more pre-stored files. For example, the object may be determined based on comparing the features extracted from the image with data indicative of model features stored in the one or more pre-stored files. As an example, the mobile SDK/API may compare the extracted feature(s) with the model feature(s) and return a recognition result. The recognition result, for example, may indicate the identity of the object. The recognition result may be returned to an effect engine (e.g., the effect engine 30). If the image contains a known place, person, or object in the database (even if the image of the place, person, or object might be captured under different viewpoint/lighting conditions than the image in the database), through scanner logic, the SDK/API may be able to figure out the corresponding instance ID. This instance ID may be used to trigger corresponding effects.

Once the object of interest is identified, the user of the client device may receive a token (e.g., prize, item, asset item, etc.) associated with the identified object of interest. At 708, an asset item may be received in response to recognizing the object. For example, if the object of interest is identified as the Eiffel Tower (e.g., a landmark), the user of the client device may receive a token. The token may be, for example, an article of clothing (shirt, jacket, pants, etc.), an accessory (sunglasses, hat, purse, etc.), or another object such as a mask, a food item, an animal, etc. If the object of interest is identified as the Eiffel Tower, the token may be, for example, something that is traditionally associated with French culture (e.g., a beret, a croissant, a baguette, etc.).

A user may collect a plurality of tokens. The user may be incentivized to visit a plurality of different locations or search for a plurality of different objects in order to collect different tokens. Some tokens may be "rare," or more difficult to find than other tokens. A user may be able to swap or trade his or her tokens with the tokens of a different user. For example, a first user may want a rare token that a second user has. The first user may be able to trade one of his or her tokens with the second user in order to acquire the rare token. The trading system 112*a* and/or the trading system 112*b* may facilitate such trading.

Figure 8:
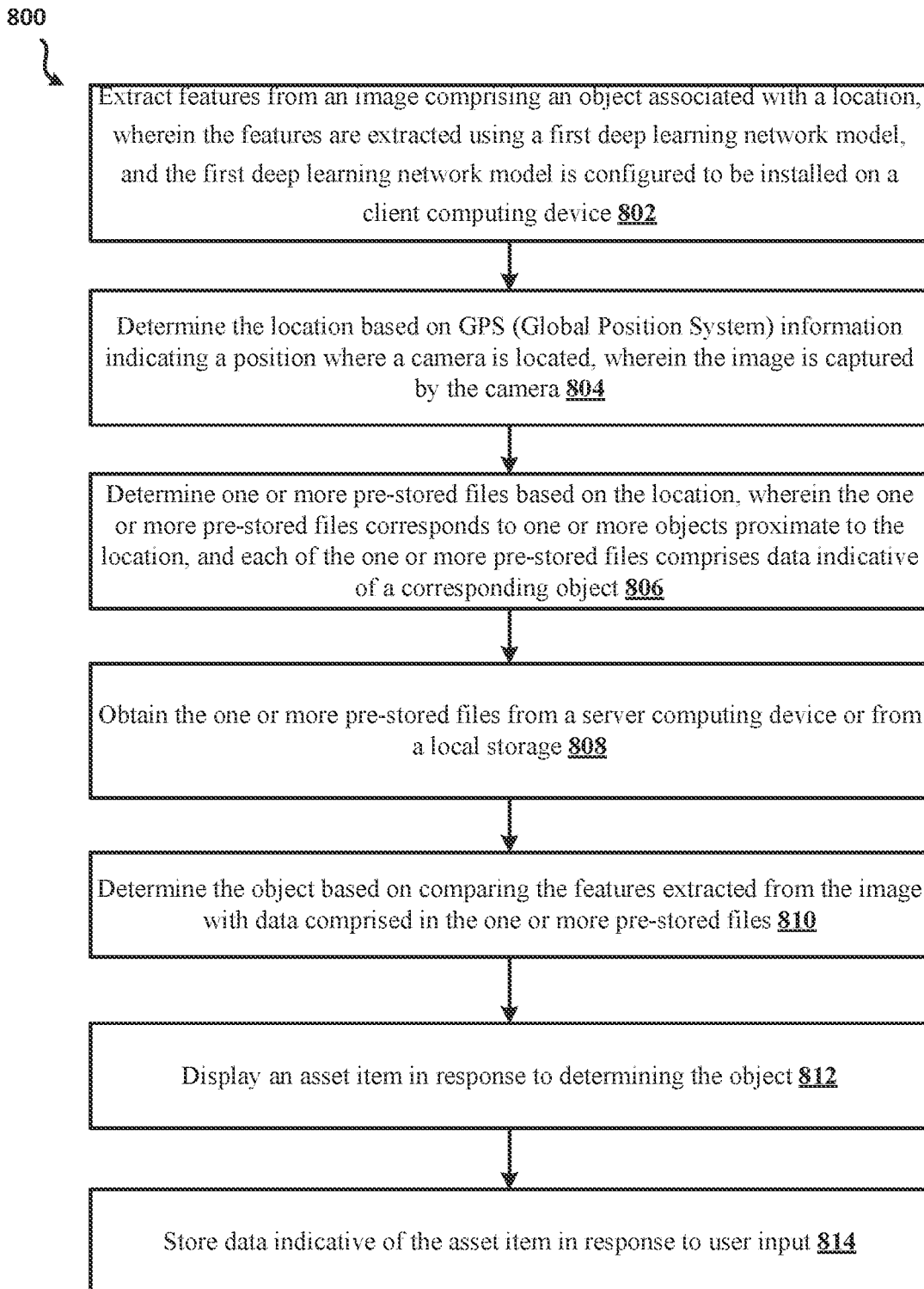
FIG. 8 shows another example process for collecting asset items in accordance with the present disclosure.

FIG. 8 shows an example client-side process 800 for collecting. The process 800 may be performed, for example, by a client-side collecting system (e.g., the collecting system 111*b* of FIG. 1). As described above, the collecting system 111*b* may utilize the framework 300 of FIG. 3. Although depicted as a sequence of operations in FIG. 8, those of ordinary skill in the art will appreciate that various embodiments may add, remove, reorder, or modify the depicted operations.

A user may capture an image via a client device. For example, an image and/or a series of images may be captured via a camera of the client device. In an embodiment, a continuous sequence of query pictures may be obtained from a camera feed and sent or forwarded to a mobile SDK/API (e.g., SDK/API 304) based on mobile computation capability. Some or all of the images may be forwarded to a mobile IRFE (e.g., mobile IRFE 312) in order to obtain global features associated with the image(s).

At 802, features may be extracted from an image. The image may depict an object, such as an object associated with a location. For example, global features may be extracted from the image. The feature extraction may be performed, for example, by a first deep learning network model installed on the client device. The first deep learning network model has been trained to extract features indicative of objects, such as landmarks. The trained deep learning network model may compute features based on one or more query frames. The first deep learning network model may serve a similar purpose as its cloud counterpart (e.g., IRFE 204), but based on a neural network platform dedicated for mobile compute with much smaller network models tailored for being installed on and used by client/user devices.

A smaller deep learning network model configured to be installed on a client device may utilize mobilenet V2 as its backbone. To reduce the size of the architecture (so that it is suitable for use on a client device), quantization-aware training (QAT) may be used, and the parameter type may be made from FP32 to FP 16. NAS may be utilized to search a better performance network, as well as to reduce the network's size. Network distill may be utilized. For example, the network that results from the previous steps may be utilized as a teacher network to train a student network which is much smaller but has similar accuracy.

At 804, the location may be determined. For example, a GPS+LBS/local dataset of the client-side collecting system (e.g., client-side collecting system 111*b*) may provide a location reading (GPS reading) to a component of the server-side collecting system (e.g., ARMS 208) to download relevant model files from the server/cloud to the client device. For example, the relevant model files may be those models associated with landmarks near the client device's current location or location at the time an image was taken (based on GPS). Alternatively, there may be a location-based service (LBS) local system to select the most relevant models, such as those based on the client device's current location or location at the time an image was taken. For example, the client device may have a list of recognition models in its local storage or cache, and/or may be able to load a subset of models based on current location.

At 806, one or more pre-stored filed may be determined based on the determined location associated with the image. The one or more pre-stored files may each correspond to one or more objects proximate to the location. For example, if the image is associated with a particular park located in a particular city, the one or more pre-stored files may each correspond to one or more people, places, objects, landmarks, etc. proximate to that park in that city. Each of the one or more pre-stored files may comprise data indicative of a corresponding object. For example, each of the one or more pre-stored files may comprise data indicative of model features associated with the corresponding object.

At 808, the one or more pre-stored files may be obtained from a server computing device (e.g., ARMS 208) and/or from a local storage. The obtained models/model features may be forwarded to a mobile SDK/API of the client-side collecting system 111*b*. The SDK/API may serve a similar purpose as the instance scanner of the server-side collecting system 111*a*.

The features extracted from the image may be compared with features indicated by one or more pre-stored files. At 810, the object depicted by the image may be determined. The object may be determined based on comparing the features extracted from the image with data comprised in the one or more pre-stored files. For example, the object may be determined based on comparing the features extracted from the image with data indicative of model features stored in the one or more pre-stored files. As an example, the mobile SDK/API may compare the extracted feature(s) with the model feature(s) and return a recognition result. The recognition result, for example, may indicate the identity of the object. The recognition result may be returned to an effect engine (e.g., the effect engine 30). If the image contains a known place, person, or object in the database (even if the image of the place, person, or object might be captured under different viewpoint/lighting conditions than the image in the database), through scanner logic, the SDK/API may be able to figure out the corresponding instance ID. This instance ID may be used to trigger corresponding effects.

Once the object of interest is identified, the user of the client device may receive a token (e.g., prize, item, asset item, etc.). At 812, an asset item may be displayed in response to determining the object. For example, if the object of interest is identified as the Eiffel Tower (e.g., a landmark), the client device may display a token associated with the Eiffel tower. The token may be, for example, an article of clothing (shirt, jacket, pants, etc.), an accessory (sunglasses, hat, purse, etc.), or another object such as a mask, a food item, an animal, etc. If the object of interest is identified as the Eiffel Tower, the token may be, for example, something that is traditionally associated with French culture (e.g., a beret, a croissant, a baguette, etc.).

In one example, the asset item may be displayed on an interface of the client device. The user of the client device may view the asset item via the interface. The asset item may be displayed, for example, in the center of the user interface. The user may be able to accept the asset item. For example, after the asset item is displayed, the user may be able to make a selection on the interface indicating that the user has accepted the asset item. Once selected, the user may own the asset item. At 814, data indicative of the asset item may be stored in response to user input.

A user may collect a plurality of asset items/tokens. The user may be incentivized to visit a plurality of different locations or search for a plurality of different objects in order to collect different tokens. Some tokens may be "rare," or more difficult to find than other tokens. A user may be able to swap or trade his or her tokens with the tokens of a different user. For example, a first user may want a rare token that a second user has. The first user may be able to trade one of his or her tokens with the second user in order to acquire the rare token. The trading system 112a and/or the trading system 112b may facilitate such trading.

Figure 9:
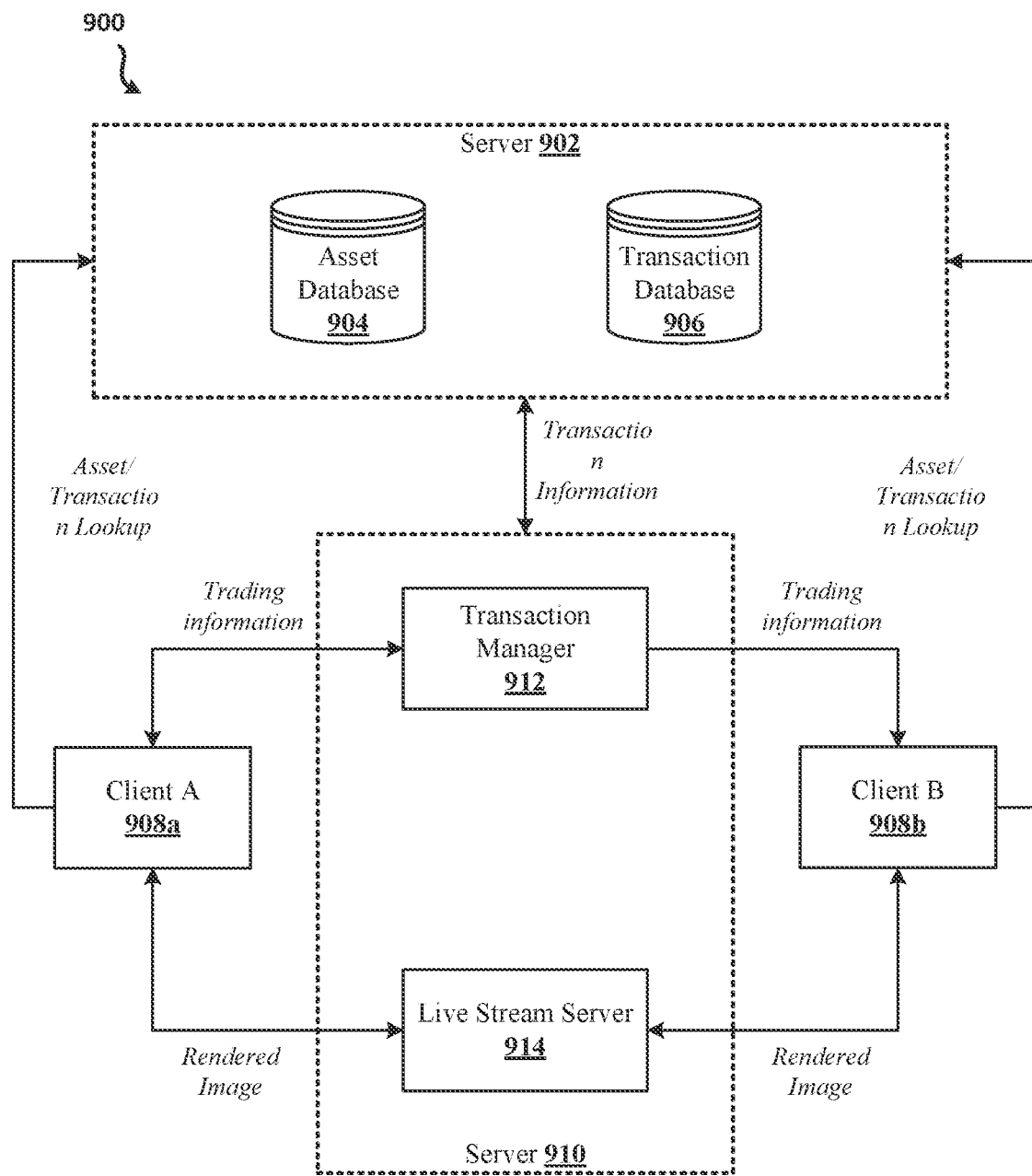
FIG. 9 shows an example framework for an asset trading system in accordance with the present disclosure.

FIG. 9 shows an example framework 900 for a server-side trading system, such as the trading system 112a of FIG. 1. The server-side trading system may be in communication with, or work in conjunction with, a client-side trading system, such as the trading system 112b of FIG. 1. The framework 900 may comprise a server 902. The server 902 may comprise an asset database 904 and/or a transaction database 906. The server 902 may be configured to store all user token data in the asset database 904. User token data may indicate, for example, how many tokens and/or which tokens each user has. The server 902 may be configured to store all transaction data in the transaction database 906. Transaction data may indicate, for example, which tokens have been traded between users (and which users were involved in the transaction). All of the communication between the server 902 and clients, such as the clients 908a-b, may be implemented by hypertext transfer protocol (HTTP) and/or any other suitable protocol.

The framework 900 may comprise a real time communication (RTC) server 910. The RTC server 910 may be configured to exchange real time data between two clients, such as the clients 908a-b, during a "trading session" (i.e., when the two clients in the process of trading tokens or deciding whether they want to trade tokens with each other). The real time data may include, for example, video stream data, try on data, audio data, or any other data that may facilitate the trading session. Such real time data is discussed in more detail below with respect to FIGS. 8-9, which depict two users participating in a trading session. Some or all communication between the RTC server 910 and the client devices may be implemented, for example, by Web Socket.

The framework 900 may include a transaction manager 912. The transaction manager 912 may be configured to handle some of all of the trading and/or some or all of the try-on requests from clients. The transaction manager 912 may additionally be configured to verify and/or commit such transactions via the server 902. For example, if two clients decide to trade two tokens, the transaction manager 912 may be configured to facilitate such as trade and to cause such transaction data to be stored in the transaction database 906. The transaction manager 912 may also be configured to cause the asset database 904 to be updated based on the trade. The live stream server 914 may be configured to stream live video and/or audio streams from each client during the trading session.

In an embodiment, a first client (such as the client 908a) may want to trade a token with a second client (such as the client 908b). The first client may transmit live video of himself or herself to the RTC server 910 with a target connection ID. The RTC server 910 may match the connection ID and send back the second client's live video stream. The first and second clients may each be able to view each other on an interface of his or her respective client device. The first and second client may want to "try-on" each other's tokens before finalizing the trade. For example, the first client may have a hat token and the second client may have a sunglass token. During the try-on process, the second client's sunglass token may appear on the face of the first client and the first client's hat token may appear on the head of the second client. The RTC server 902 may facilitate this try-on process using the same connection ID techniques.

Once the try-on process is complete, the first and second clients may decide that they do not want to trade the tokens. If the first and second clients decide that they do not want to trade the tokens, the trading session may be terminated. Alternatively, the first and second clients may decide that they do want to trade the tokens. If the first and second clients decide that they do want to trade the tokens, the first and/or second client may confirm the trade, such as by sending out a trading request. The transaction may be verified and committed to the server 902 by the RTC server 910.

Figure 10:
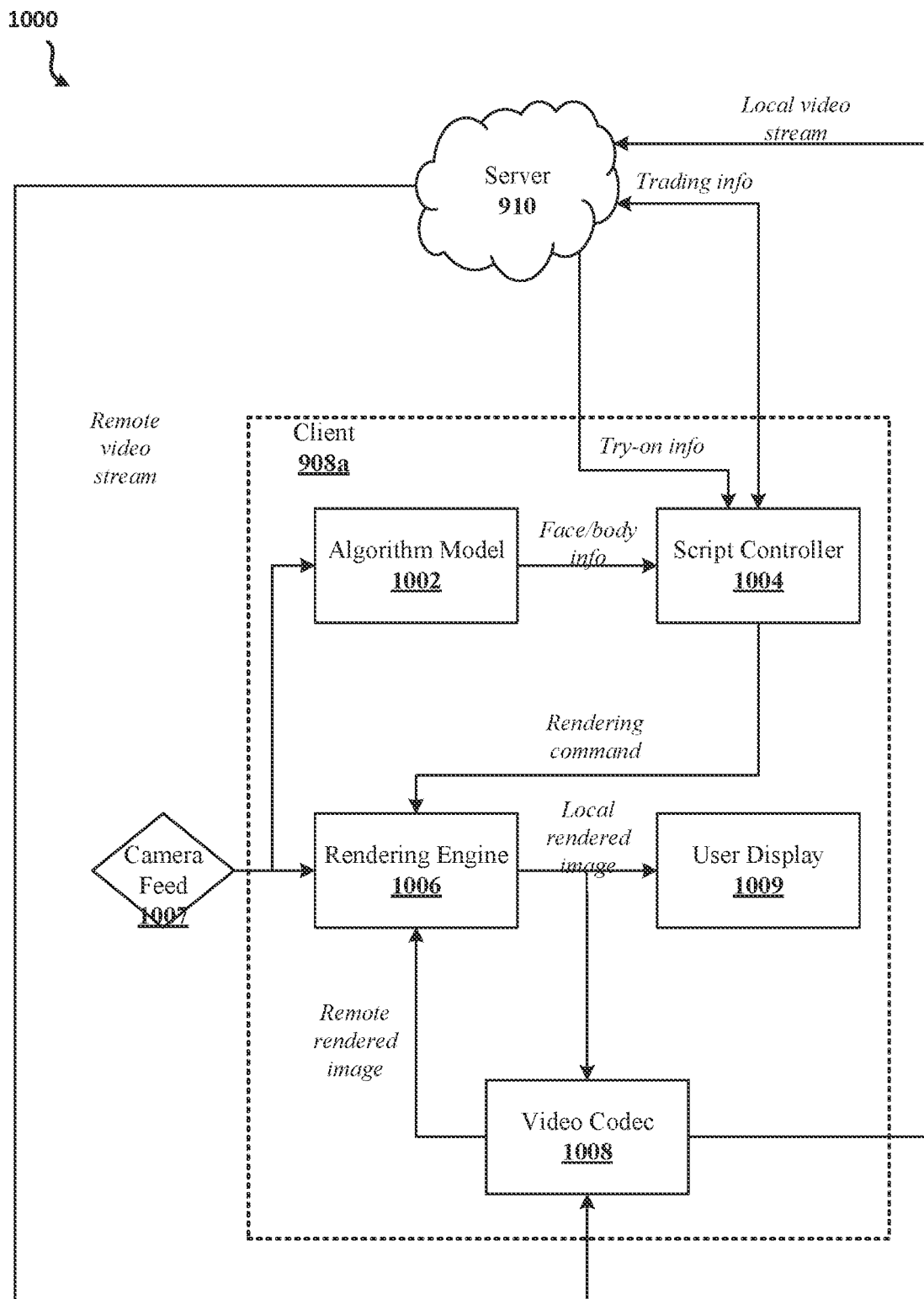
FIG. 10 shows another example framework for an asset trading system in accordance with the present disclosure.

FIG. 10 shows an example framework 1000 for a client-side trading system, such as the trading system 112b of FIG. 1. The client-side trading system may be in communication with, or work in conjunction with, a server-side trading system, such as the trading system 112a of FIG. 1. The framework 1000 may be utilized by a client device (e.g., client 908a or client 908b) to initiate or participate in a try-on and/or trading session. The framework 1000 may comprise the RTC server 910 described above with respect to FIG. 9. As described above, the RTC server 910 may be configured to exchange real time data between two clients, such as the clients 908a-b, during a "trading session" (i.e., when the two clients in the process of trading tokens or deciding whether they want to trade tokens with each other). The real time data may include, for example, video stream data, try on data, audio data, or any other data that may facilitate the trading session. Such real time data is discussed in more detail below with respect to FIGS. 12-13, which depict two users participating in a trading session. Some or all communication between the RTC server 910 and the client devices may be implemented, for example, by Web Socket.

The framework 1000 may comprise an algorithm model 1002. The algorithm model 1002 may be configured to receive live camera images/frames and output human related algorithm results for try-on token rendering. For example, the algorithm model 1002 may be configured to output a user's face, head, and/or body for try-on asset rendering. The framework 1000 may comprise a script controller 1004. The script controller 1004 may be configured to handle all interactions between the two clients that are in a trading session. The script controller 1004 may be configured to determine which tokens should be rendered in which ways. For example, if a client sends a request to try on a hat token, the script controller 1004 may be configured to use the head algorithm result from the algorithm model 1002 to render the specified hat token. Additionally, the script controller 1004 may be configured to receive client input and send it back to the RTC server 910.

The framework 1000 may comprise a rendering engine 1006. The rendering engine 1006 may receive a live camera feed 1007 and render a command from the script controller 1004. The rendering engine 1006 may render the token to a correct position on the live camera image. For example, if the token is a hat, the rendering engine 1006 may render the token on the client's head on the live camera image of the client. In an embodiment, the rendering engine 1006 may receive both a remote video stream and a locally rendered image and combine them into a split screen effect. For example, the rendering engine 1006 may receive both a remote video stream from the client 908b and a locally rendered image from the client 908a and combine them into a split screen effect on a user display 1009 of a device of the client 908a. Accordingly, the client 908a may be able to see themselves (e.g., his or her face, body, head, etc.) as well as the face, head, or body of the other client that they are trading tokens with simultaneously on the same interface.

The framework 1000 may comprise a video codec 1008. The video codec 1008 may be configured to receive the rendered image and encode them into a video stream. The video codec 1008 may be configured to receive a remote video stream and decode it into one or more images/frames. The video codec 1008 may be configured to send the decoded images to the rendering engine 1006 for split screen effect rendering.

Figure 11:
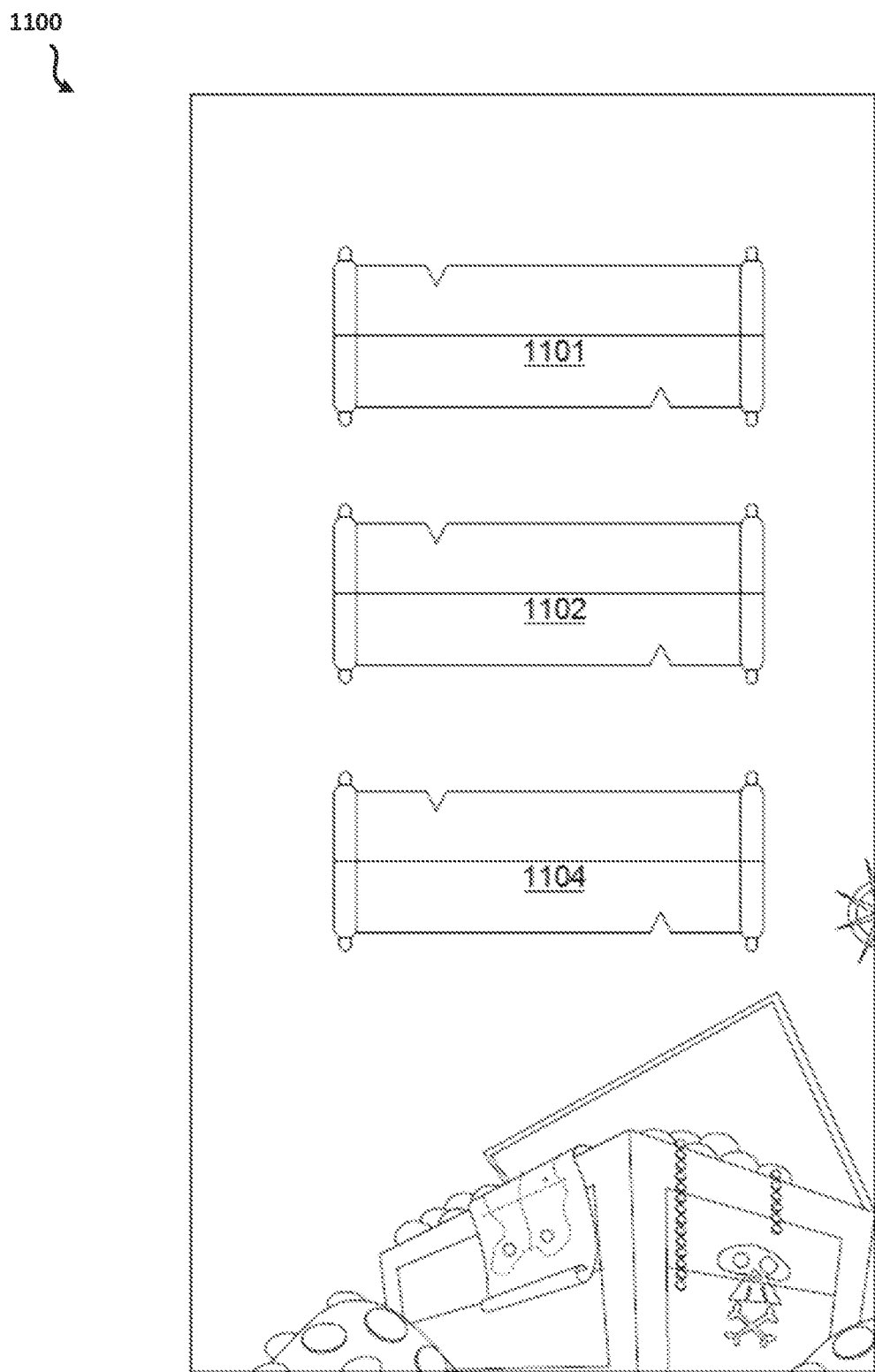
FIG. 11 shows an example user interface for initiating collecting or trading asset items in accordance with the present disclosure.

FIG. 11 shows an example user interface (UI) 1100 for initiating trading or collecting. A user of a client device (e.g., client device 104a-d, 908a-b) may view the UI 1100 to initiate either a collection or a trading session. The user may select the button 1101 to view the tokens (e.g., asset items) that the user has collected. The tokens that the user has collected may be the tokens that are available for the user to trade with other users. The user may want to collect additional tokens other than those tokens already collected. To initiate a collection, the user may select the button 1102. If the user selects the button 1102, the user may use a camera of the client device to capture one or more images of an object of interest (e.g., place, person, product, landmark, etc.). An object recognition model, such as the collection model 111a and/or collection model 111b, may be used to identify the object of interest.

In an embodiment, the image recognition system that is utilized may provide both server-side and client-side capabilities. Both the client(s) and the server may share a single model production pipeline. Global features may be extracted from a single image of one place, person, or object. After these global features are extracted once, these pre-computed features may be indicated in a model file. This model file may be used by either the client device(s) or the server to perform image recognition tasks. By allowing the client device(s) and server to share a single model production pipeline, the image recognition system described herein experiences more flexibility than prior image recognition systems and provides the foundation for generalization recognition.

The image recognition system described herein utilizes deep learned features extracted from a deep learning model to recognize places, people, or objects within an image. Compared to existing image recognition systems, this deep learned feature extraction provides a huge efficiency improvement. For example, a 3D model does not need to be reconstructed for every new landmark. These global features may be used for recognition and/or as an augmented reality (AR) trigger. As a result, there may be no need for the detailed structure or geometric information associated with the place, person, or object, which likely demands 3D reconstruction from many more images.

Compared to traditional handcrafted feature (e.g., SIFT), these deep learned features have a more robust recognition capability under dramatic change of lighting, camera distance and angle. For example, the deep learning model may be trained using many millions of classified or annotated images of a place, person, or object under various lighting and viewing conditions. Accordingly, the produced model is able to grasp the distinct features of places, persons, or objects under similarly challenging situations. The utilized image recognition system has a robust recognition capability under dramatic change of lighting, camera distance and angle. As a result, the image captured by the user may be identified regardless of the environment or circumstances in which the image was captured.

Once the object of interest in the captured image is identified, the user may receive a token associated with the object of interest. As described above, the token (e.g., prize, item, asset, etc.) may be, for example, an article of clothing (shirt, jacket, pants, etc.), an accessory (sunglasses, hat, purse, etc.), or another object such as a mask, a food item, an animal, etc. If the object of interest is identified as the Eiffel Tower, the token may be, for example, something that is traditionally associated with French culture (e.g., a beret, a croissant, a baguette, etc.).

A user may collect a plurality of tokens. The user may be incentivized to visit a plurality of different locations or search for a plurality of different objects in order to collect different tokens. Some tokens may be "rare," or more difficult to find than other tokens. A user may be able to swap or trade his or her tokens with the tokens of a different user. For example, a first user may want a rare token that a second user has. The first user may be able to trade one of his or her tokens with the second user in order to acquire the rare token. The trading system 112a and/or the trading system 112b may facilitate such trading. To initiate such a trading session, the user may select the button 1104.

Figure 12:
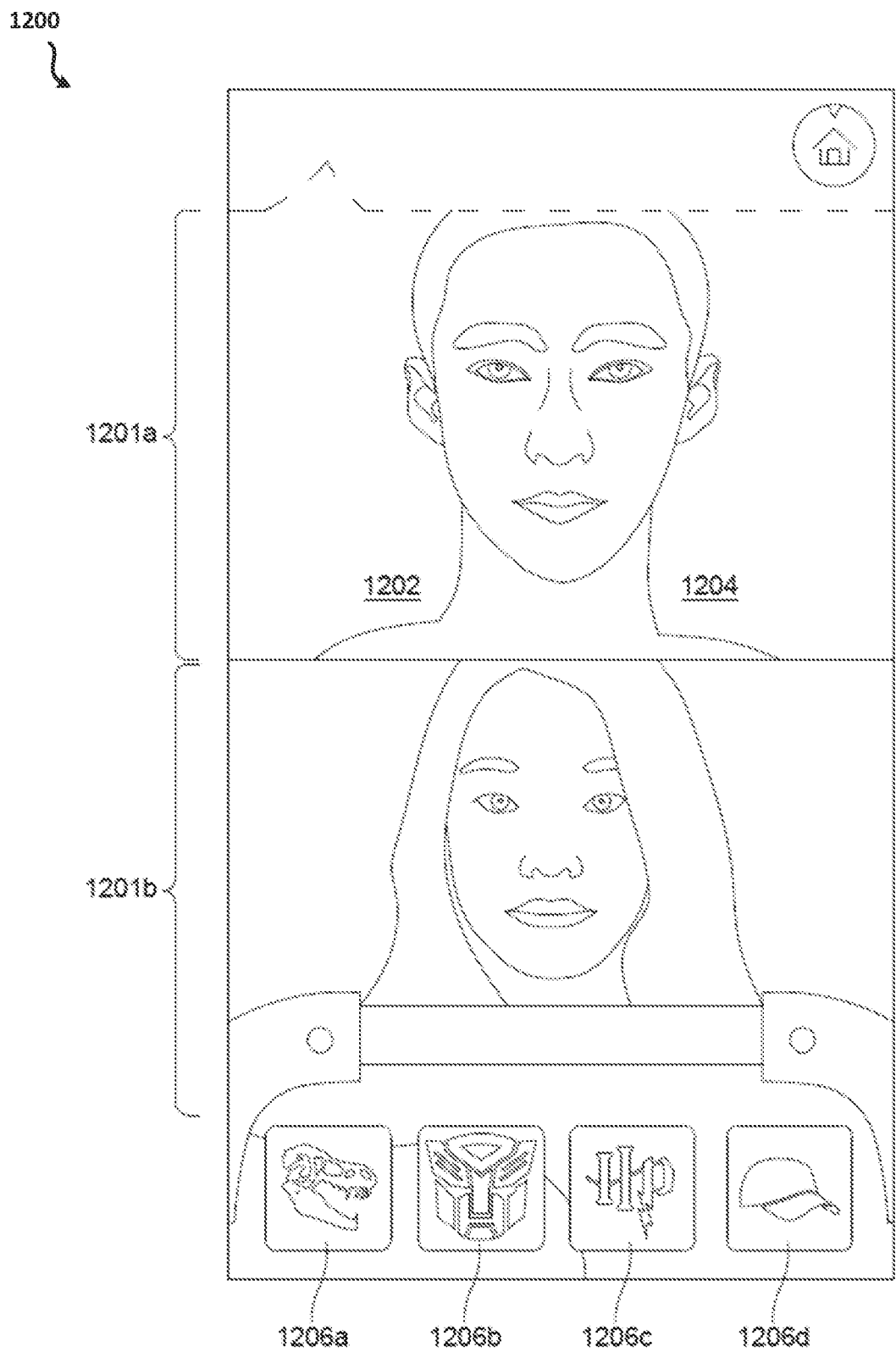
FIG. 12 shows an example user interface for trading asset items in accordance with the present disclosure.

If the user initiates a trading session, the user may view the UI 1200 of FIG. 12. FIG. 12 shows an example UI 1200 for trading. As discussed above, in an embodiment, the rendering engine 1006 may receive both a remote video stream and a locally rendered image and combine them into a split screen effect. For example, the rendering engine 1006 may receive both a remote video stream from a first client device and a locally rendered image from a second client device and combine them into a split screen effect on a user display of a device of the second client. Accordingly, the second client may be able to see themselves (e.g., his or her face, body, head, etc.) as well as the face, head, or body of the other client that they are trading tokens with simultaneously on the same interface.

The UI 1200 illustrates this split screen effect. For example, the UI is divided into a first portion 1201a and a second portion 1201b. The first portion 1201a is associated with a remote video stream from a first client device (associated with a first client) and the second portion 1201b is associated with a locally rendered image from a second client device (associated with a second client). As a result, the user of the second client device may be able to see themselves (e.g., his or her face, body, head, etc.) in the second portion 1201*b*, as well as the face, head, or body of the other client that they are trading tokens with simultaneously on the same interface in the first portion 1201*a*. The first and/or second client device may have been responsible for initiating the trading session.

In other embodiments, the first portion 1201*a* may be associated with the locally rendered image from the second client device and the second portion 1201*b* may be associated with the remote video stream from the first client device. In some embodiments, the screen may be split vertically rather than horizontally. In some embodiments, the first portion 1201*a* and the second portion 1201*b* are different sizes, so that the first portion 1201*a* is smaller than or larger than the second portion 1201*b*. In some embodiments, the first portion 1201*a* and the second portion 1201*b* may overlap with each other, so that the first portion 1201*a* is smaller than the second portion 1201*b* and is overlaid on the second portion 1201*b* (or vice versa). Any embodiment that allows the two clients participating in the trading session to see both clients simultaneously is suitable.

The first client (associated with the first portion 1201*a*) and the second client (associated with the second portion 1201*b*) may want to trade tokens with each other. To request a trade of one or more tokens that belong to the other client, he or she may select one of the buttons 1206*a*-*d*. Each of the buttons 1206*a*-*d* represent a single token. For example, the buttons 1206*a*-*d* may represent the tokens of the first client if the UI 1200 is an interface of a device belonging to the second client. If the second client selects the first button 1206*a*, the second client may request that the first client trade the token represented by the first button 1206*a*. Likewise, if the second client selects the button 1206*b*, the second client may request that the first client trade the token represented by the button 1206*b*. If the second client selects the button 1206*c*, the second client may request that the first client trade the token represented by the button 1206*c*. If the second client selects the button 1206*d*, the second client may request that the first client trade the token represented by the button 1206*d*.

The first client may be able to accept or deny this request to trade. To deny the request, the first client may select the button 1202. The first client may want to deny the request if the second user is requesting a token that is particularly enjoyable, useful, or important to the first user. Additionally, the first client may want to deny the request if the second user does not have any desirable tokens to swap for the requested token. Conversely, to accept the request, the first client may select the button 1204. The first client may want to accept the request if the second user is requesting a token that is not particularly enjoyable, useful, or important to the first user. Additionally, the first client may want to accept the request if the second user has a desirable token to swap for the requested token.

Figure 13:
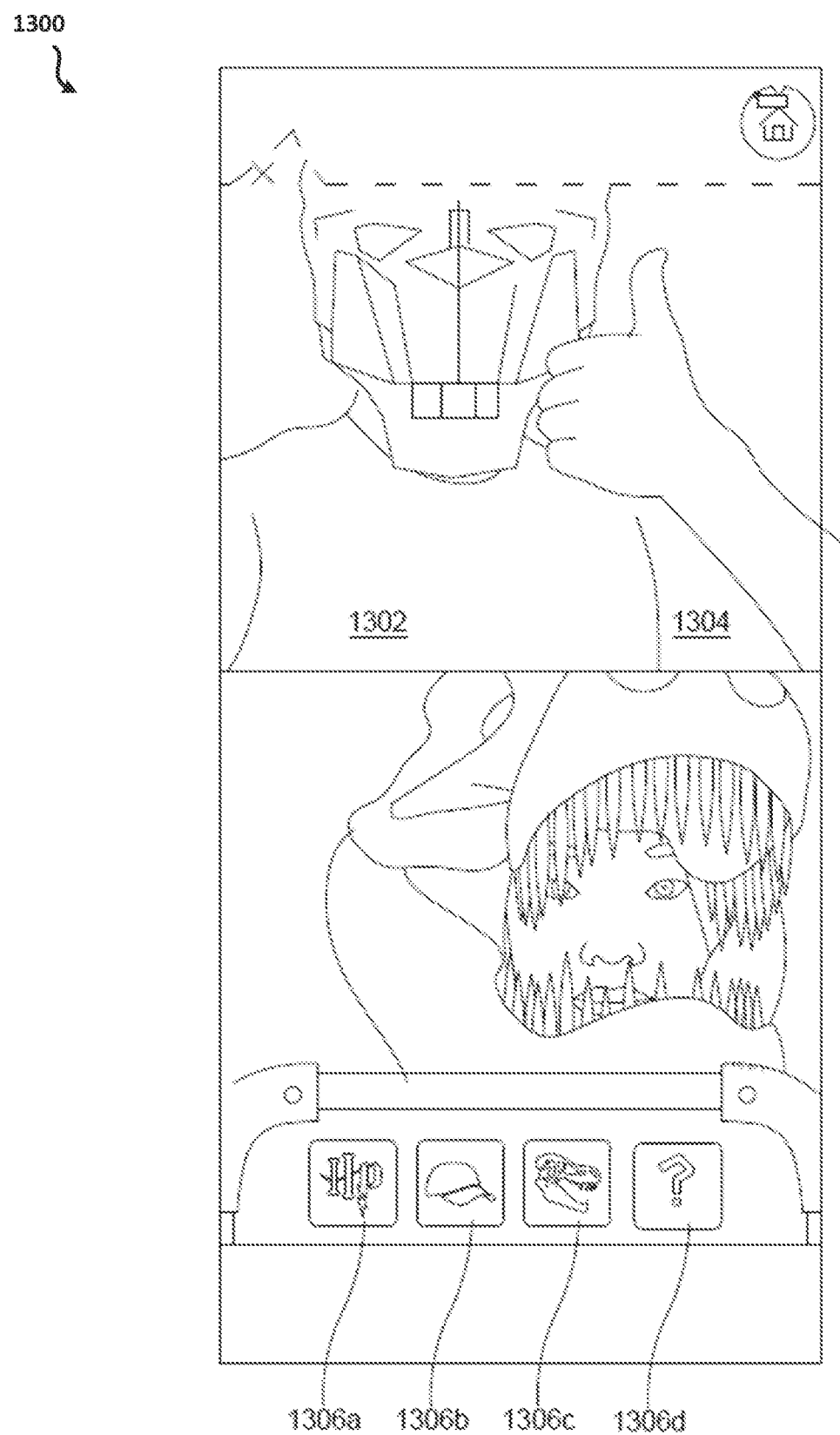
FIG. 13 shows another example user interface for trading asset items in accordance with the present disclosure.

FIG. 13 shows another example user interface for trading. The first client (associated with the first portion 1201*a*) and the second client (associated with the second portion 1201*b*) may want to try-on tokens before confirming a trade during the trading session. To try-on one or more tokens that belong to the other client, he or she may select one of the buttons 1306*a*-*d*. Each of the buttons 1306*a*-*d* represent a single token. For example, the buttons 1306*a*-*d* may represent the tokens of the first client if the UI 1300 is an interface of a device belonging to the second client. If the second client selects the first button 1306*a*, the second client may try-on the token represented by the button 1306*a*. If the second client selects the button 1306*b*, the second client may try-on the token represented by the button 1306*b*. If the second client selects the button 1306*c*, the second client may try-on the token represented by the button 1306*c*. If the second client selects the button 1306*d*, the second client may try-on the token represented by the button 1306*d*.

To try on a token, a visual representation of the token may be rendered onto or near the client's face, head, or body. For example, if the token is a hat, a visual representation of a hat may be rendered on to the head of the client that is trying that token on. As shown in FIG. 13, the clients are each trying on mask tokens owned by the other client. After trying on the token, the client(s) may decide whether they like the token enough to complete the trade.

The first client may be able to accept or deny the trade. To deny the trade, the first client may select the button 1302. The first client may want to deny the request if the second user is requesting a token that is particularly enjoyable, useful, or important to the first user. Additionally, the first client may want to deny the request if the second user does not have any desirable tokens to swap for the requested token (e.g., the first client did not enjoy the token during the try-on). Conversely, to accept the request, the first client may select the button 1304. The first client may want to accept the request if the second user is requesting a token that is not particularly enjoyable, useful, or important to the first user. Additionally, the first client may want to accept the request if the second user has a desirable token to swap for the requested token (e.g., the first client enjoyed the token during the try-on).

Figure 14:
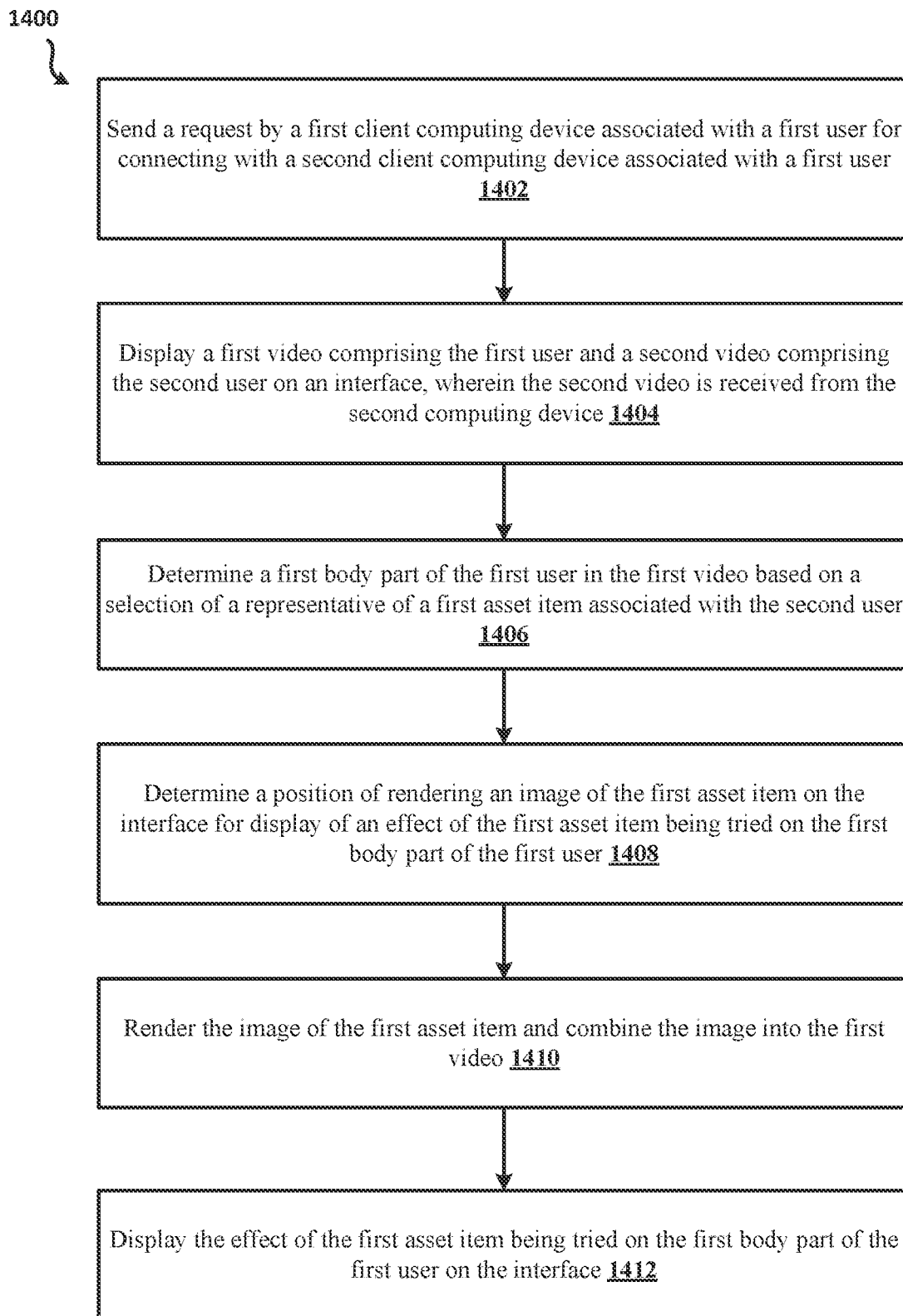
FIG. 14 shows an example process for trading asset items in accordance with the present disclosure.

FIG. 14 shows an example client-side process 1400 for trading. The process 1400 may be performed, for example, by a client-side trading system (e.g., the trading system 112*b* of FIG. 1). As described above, the trading system 112*b* may utilize the framework 1000 of FIG. 10. Although depicted as a sequence of operations in FIG. 14, those of ordinary skill in the art will appreciate that various embodiments may add, remove, reorder, or modify the depicted operations.

As discussed above, a user may collect a plurality of asset items (e.g., tokens). The user may be incentivized to visit a plurality of different locations or search for a plurality of different objects in order to collect different tokens. Some tokens may be "rare," or more difficult to find than other tokens. A user may be able to swap or trade his or her tokens with the tokens of a different user. For example, a first user may want a rare token that a second user has. The first user may be able to trade one of his or her tokens with the second user in order to acquire the rare token.

If the first user wants to initiate a trading session with a second client, the first user may send a request for connecting with the second user. At 1402, a request may be sent by a first client computing device for connecting with a second client computing device. The request comprises identification information for identifying the second computing device. The first client computing device may be associated with the first user. The second client computing device may be associated with the second user.

The trading session may be initiated, based on the second client computing device receiving the request. The trading session may be initiated, for example, via a live-video feed. At 1404, a first video and second video may be displayed. The first video may depict the first user and the second video may depict the second user on an interface, such as an interface of the first client device and/or the second client device. The second video may be received from the second computing device.

For example, as discussed above, a rendering engine (e.g., the rendering engine 1006) may receive both a remote video stream and a locally rendered image and combine them into a split screen effect. For example, the rendering engine may receive both a remote video stream from either the first client device or the second client device and a locally rendered image from the other client device and combine them into a split screen effect on a user display of the second and/or first client devices. Accordingly, the first and second clients may be able to see themselves (e.g., his or her face, body, head, etc.) as well as the face, head, or body of the other client that they are trading tokens with simultaneously on the same interface. The UI 1200, discussed above, illustrates this split screen effect. Any UI embodiment that allows the two clients participating in the trading session to see both clients simultaneously is suitable.

The first user may select an asset item belonging to the second user. For example, the first user may select an asset item belonging to the second user that the first user wants to "try-on." At 1406, a first body part of the first user in the first video based may be determined based on a selection of a representative of a first asset item associated with the second user. The representative of the first asset item may be, for example, one of the buttons 1206a-d discussed above with respect to FIG. 12. The first asset item may be an asset item that the first user wants to "try-on." For example, the first asset item may be a hat, a mask, sunglasses, a glove, etc. The first body part may be determined based on the first asset item, such as based on a body part/region associated with the first asset item. For example, if the first asset item is a hat, the first body part may be determined to be a head (because when trying on a hat, one tries the hat on his or her head). Likewise, if the first asset item is a mask or sunglasses, the first body part may be determined to be a face (because when trying on a mask or sunglasses, one tries the mask or sunglasses on his or her face). Similarly, if the first asset item is a glove, the first body part may be determined to be a hand and/or arm (because when trying on a glove, one tries the glove on his or her hand/arm).

At 1408, a position associated with rendering an image of the first asset item may be determined. For example, a position associated with rendering an image of the first asset item on the interface for display of an effect of the first asset item may be determined. The position may be determined based on a position of the determined first body part. For example, if the first body part is determined to be a head of the first user, the position associated with rendering the image of the first asset item may be the position of the head of the first user. The position may be static, or alternatively, may move with the first body part. For example, if the first body part is a hand, and the first user is moving the hand, the position associated with rendering the image of the first asset item may change with the movement of the hand. The image of the first asset may be rendered on the first body part of the first user so that the first user can "try-on" the asset.

At 1410, the image of the first asset item may be rendered and the image may be combined with/into the first video. For example, the image of the first asset item may be rendered based on the determined position. As discussed above, the determined position is associated with the first body part. Accordingly, the image of the first asset item may be rendered according to the first body part. If the first asset item is, for example, a hat, the first asset item may be rendered on the head of the first user. The head of the first user may be associated with a position (static or moving). As a result, the first asset item may be rendered at the position so that the first asset item appears on/near the first body part. If the first body part is moving, the first asset item may be rendered so that its position changes with the first body part.

At 1412, the effect of the first asset item being tried on the first body part of the first user may be displayed on the interface. The first and second client may want to "try-on" each other's tokens before finalizing the trade. For example, the first client may have a hat token and the second client may have a sunglass token. During the try-on process, the second client's sunglass token may appear on the face of the first client and the first client's hat token may appear on the head of the second client. Once the try-on process is complete, the first and second clients may decide that they do not want to trade the tokens. If the first and second clients decide that they do not want to trade the tokens, the trading session may be terminated. Alternatively, the first and second clients may decide that they do want to trade the tokens. If the first and second clients decide that they do want to trade the tokens, the first and/or second client may confirm the trade, such as by sending out a trading request. The transaction may be verified and committed, such as to the server 902, by the RTC server 910.

FIG. 15 shows an example client-side process 1500 for trading. The process 1500 may be performed, for example, by a client-side trading system (e.g., the trading system 112b of FIG. 1). As described above, the trading system 112b may utilize the framework 1000 of FIG. 10. Although depicted as a sequence of operations in FIG. 15, those of ordinary skill in the art will appreciate that various embodiments may add, remove, reorder, or modify the depicted operations.

As discussed above, a user may collect a plurality of asset items (e.g., tokens). The user may be incentivized to visit a plurality of different locations or search for a plurality of different objects in order to collect different tokens. Some tokens may be "rare," or more difficult to find than other tokens. A user may be able to swap or trade his or her tokens with the tokens of a different user. For example, a first user may want a rare token that a second user has. The first user may be able to trade one of his or her tokens with the second user in order to acquire the rare token.

If the first user wants to initiate a trading session with a second client, the first user may send a request for connecting with the second user. At 1502, a request may be sent by a first client computing device for connecting with a second client computing device. The first client computing device may be associated with the first user. The second client computing device may be associated with the second user.

The trading session may be initiated, based on the second client computing device receiving the request. The trading session may be initiated, for example, via a live-video feed. At 1504, a first video and second video may be displayed. The first video may depict the first user and the second video may depict the second user on an interface, such as an interface of the first client device and/or the second client device. The second video may be received from the second computing device.

For example, as discussed above, a rendering engine (e.g., the rendering engine 1006) may receive both a remote video stream and a locally rendered image and combine them into a split screen effect. For example, the rendering engine may receive both a remote video stream from either the first client device or the second client device and a locally rendered image from the other client device and combine them into a split screen effect on a user display of the second and/or first client devices. Accordingly, the first and second clients may be able to see themselves (e.g., his or her face, body, head, etc.) as well as the face, head, or body of the other client that they are trading tokens with simultaneously on the same interface. The UI 1200, discussed above, illustrates this split screen effect. Any UI embodiment that allows the two clients participating in the trading session to see both clients simultaneously is suitable.

The first user may select an asset item belonging to the second user. For example, the first user may select an asset item belonging to the second user that the first user wants to "try-on." At 1506, a first body part of the first user in the first video based may be determined based on a selection of a representative of a first asset item associated with the second user. The representative of the first asset item may be, for example, one of the buttons 1206*a*-*d* discussed above with respect to FIG. 12. The first asset item may be an asset item that the first user wants to "try-on." For example, the first asset item may be a hat, a mask, sunglasses, a glove, etc. The first body part may be determined based on the first asset item, such as based on a body part/region associated with the first asset item. For example, if the first asset item is a hat, the first body part may be determined to be a head (because when trying on a hat, one tries the hat on his or her head). Likewise, if the first asset item is a mask or sunglasses, the first body part may be determined to be a face (because when trying on a mask or sunglasses, one tries the mask or sunglasses on his or her face). Similarly, if the first asset item is a glove, the first body part may be determined to be a hand and/or arm (because when trying on a glove, one tries the glove on his or her hand/arm).

At 1508, a position associated with rendering an image of the first asset item may be determined. For example, a position associated with rendering an image of the first asset item on the interface for display of an effect of the first asset item may be determined. The position may be determined based on a position of the determined first body part. For example, if the first body part is determined to be a head of the first user, the position associated with rendering the image of the first asset item may be the position of the head of the first user. The position may be static, or alternatively, may move with the first body part. For example, if the first body part is a hand, and the first user is moving the hand, the position associated with rendering the image of the first asset item may change with the movement of the hand. The image of the first asset may be rendered on the first body part of the first user so that the first user can "try-on" the asset.

At 1510, the image of the first asset item may be rendered and the image may be combined with/into the first video. For example, the image of the first asset item may be rendered based on the determined position. As discussed above, the determined position is associated with the first body part. Accordingly, the image of the first asset item may be rendered according to the first body part. If the first asset item is, for example, a hat, the first asset item may be rendered on the head of the first user. The head of the first user may be associated with a position (static or moving). As a result, the first asset item may be rendered at the position so that the first asset item appears on/near the first body part. If the first body part is moving, the first asset item may be rendered so that its position changes with the first body part.

At 1512, the effect of the first asset item being tried on the first body part of the first user may be displayed on the interface. The first and second client may want to "try-on" each other's tokens before finalizing the trade. For example, the first client may have a hat token and the second client may have a sunglass token. During the try-on process, the second client's sunglass token may appear on the face of the first client and the first client's hat token may appear on the head of the second client. Once the try-on process is complete, the first and second clients may decide that they do not want to trade the tokens. If the first and second clients decide that they do not want to trade the tokens, the trading session may be terminated. Alternatively, the first and second clients may decide that they do want to trade the tokens. If the first and second clients decide that they do want to trade the tokens, the first and/or second client may confirm the trade by clicking an interface element displayed on the user interface. At 1514, the first asset item may be received from the second user based on the effect of the first asset item being tried on by the first user and user input. The transaction may be verified and committed, such as to the server 902, by the RTC server 910.

If the first user wants to try-on a different asset item belonging to the second user, the first user may select a different asset item belonging to the second user. For example, the first user may select a second asset item belonging to the second user that the first user wants to "try-on." At 1516, a second body part of the first user in the first video based may be determined based on a selection of a representative of a second asset item associated with the second user. The representative of the second asset item may be, for example, one of the buttons 1206*a*-*d* discussed above with respect to FIG. 12. The second asset item may be a different asset item that the first user wants to "try-on." For example, the second asset item may different than the first asset item, and may be a hat, a mask, sunglasses, a glove, etc.

The second body part may be determined based on the second asset item, such as based on a body part/region associated with the second asset item. For example, if the second asset item is a hat, the second body part may be determined to be a head (because when trying on a hat, one tries the hat on his or her head). Likewise, if the second asset item is a mask or sunglasses, the second body part may be determined to be a face (because when trying on a mask or sunglasses, one tries the mask or sunglasses on his or her face). Similarly, if the second asset item is a glove, the second body part may be determined to be a hand and/or arm (because when trying on a glove, one tries the glove on his or her hand/arm). The second body part may be the same as, or different from, the first body part.

At 1518, the effect of the second asset item being tried on the second body part of the first user may be displayed on the interface. The first and second users may want to "try-on" each various ones of each other's tokens before finalizing the trade. For example, the first client may have a hat token and the second client may have a sunglass token. During the try-on process, the second client's sunglass token may appear on the face of the first client and the first client's hat token may appear on the head of the second client. The first and/or second client may not like the first token, so the first and/or second client may try on a different token to decide if he or she likes that token. Once the try-on process is complete, the first and second clients may decide that they do not want to trade one or more of the tokens that have been tried on. If the first and second clients decide that they do not want to trade any tokens, the trading session may be terminated. Alternatively, the first and second clients may decide that they do want to trade one or more of the tokens. If the first and second clients decide that they do want to trade one or more of the tokens, the first and/or second client may confirm the trade by selecting an interactive interface element. The transaction may be verified and committed, such as to the server 902, by the RTC server 910.

FIG. 16 shows an example client-side process 1600 for trading. The process 1400 may be performed, for example, by a client-side trading system (e.g., the trading system 112b of FIG. 1). As described above, the trading system 112b may utilize the framework 1000 of FIG. 10. Although depicted as a sequence of operations in FIG. 16, those of ordinary skill in the art will appreciate that various embodiments may add, remove, reorder, or modify the depicted operations.

The user that initiated the trading session may not be the only user that wants to try-on asset items belonging to the other user. For example, the processes 1400 and 1500 are associated with the first user (who initiated the trading session), trying on asset items belonging to the second user. However, the second user may additionally, or alternatively, try on asset items belonging to the first user. At 1602, a request may be sent by a first client computing device for connecting with a second client computing device. The first client computing device may be associated with the first user. The second client computing device may be associated with the second user.

The trading session may be initiated, based on the second client computing device receiving the request. The trading session may be initiated, for example, via a live-video feed. At 1604, a first video and second video may be displayed. The first video may depict the first user and the second video may depict the second user on an interface, such as an interface of the first client device and/or the second client device. The second video may be received from the second computing device.

For example, as discussed above, a rendering engine (e.g., the rendering engine 1006) may receive both a remote video stream and a locally rendered image and combine them into a split screen effect. For example, the rendering engine may receive both a remote video stream from either the first client device or the second client device and a locally rendered image from the other client device and combine them into a split screen effect on a user display of the second and/or first client devices. Accordingly, the first and second clients may be able to see themselves (e.g., his or her face, body, head, etc.) as well as the face, head, or body of the other client that they are trading tokens with simultaneously on the same interface. The UI 1200, discussed above, illustrates this split screen effect. Any UI embodiment that allows the two clients participating in the trading session to see both clients simultaneously is suitable.

At 1606, a plurality of representatives corresponding to a plurality of asset items associated with the first user may be displayed on the interface, such as in a third portion or area of the interface. The plurality of representatives may be, for example, the buttons 1206a-d discussed above with respect to FIG. 12. Each of the plurality of representatives may correspond to an asset item belonging to the first user. The second user may select one of the plurality of representatives corresponding to an asset item belonging to the first user. For example, second user may select one of the plurality of representatives corresponding to an asset item belonging to the first user that the second user wants to try on. At 1608, in response to a selection of one of the plurality of representatives, a request for trying on a corresponding asset item may be sent by the second user.

At 1610, a body part of the second user in the second video based may be determined based on the selection of a representative of the asset item associated with the first user. The representative of the asset item may be, for example, one of the buttons 1206a-d discussed above with respect to FIG. 12. The asset item may be an asset item that the second user wants to "try-on." For example, the asset item may be a hat, a mask, sunglasses, a glove, etc. The body part of the second user may be determined based on the asset item, such as based on a body part/region associated with the asset item. For example, if the asset item is a hat, the body part of the second user may be determined to be a head (because when trying on a hat, one tries the hat on his or her head). Likewise, if the asset item is a mask or sunglasses, the body part of the second user may be determined to be a face (because when trying on a mask or sunglasses, one tries the mask or sunglasses on his or her face). Similarly, if the asset item is a glove, the body part of the second user may be determined to be a hand and/or arm (because when trying on a glove, one tries the glove on his or her hand/arm).

At 1612, an image of the corresponding asset item may be rendered and the image may be combined into the second video. For example, the image of the corresponding asset item may be rendered and the image may be combined with/into the second video. For example, the image of the corresponding asset item may be rendered based on a determined position associated with the body part of the second user. The determined position may be associated with the body part of the second user. Accordingly, the image of the corresponding asset item may be rendered according to the body part of the second user. If the corresponding asset item is, for example, a hat, the corresponding asset item may be rendered on the head of the second user. The head of the second user may be associated with a position (static or moving). As a result, the corresponding asset item may be rendered at the position so that the corresponding asset item appears on/near the body part of the second user. If the body part is moving, the corresponding asset item may be rendered so that its position changes with the body part. At 1614, an effect of the corresponding asset item being tried on the body part of the second user may be displayed.

At 1616, the corresponding asset item may be sent to the second user based on the effect of the corresponding asset item being tried on the body part of the second user and user input. If the second user likes the asset item belonging to the first user, the second user may want to confirm a trade of the asset item for one of the asset items belonging to the second user. If the trade is confirmed, the asset item may no longer belong to the first user. Instead, the asset item may belong to the second user. Likewise, the asset item that used to belong to the second user may now belong to the first user.

Figure 17:
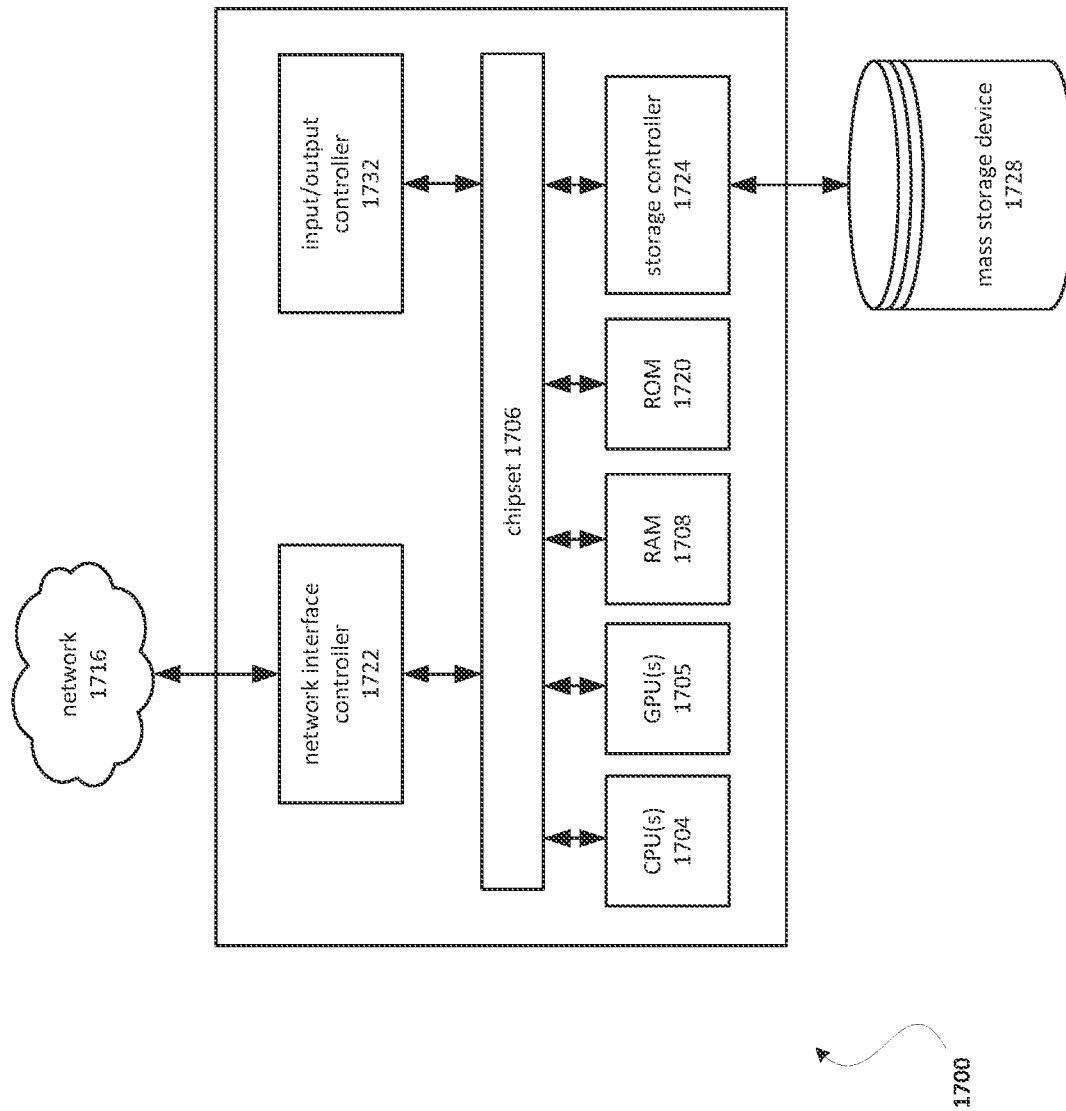
FIG. 17 shows an example computing device which may be used to perform any of the techniques disclosed herein.

FIG. 17 illustrates a computing device that may be used in various aspects, such as the services, networks, modules, and/or devices depicted in FIG. 1. With regard to the example architecture of FIG. 1, cloud network 102, the network 120, the client devices 104a-d, the service 113, the image recognition 110a-b models, the collecting systems 111a-b, the trading systems 112a-b, and/or the node 118 may each be implemented by one or more instance of a computing device 1700 of FIG. 17. The computer architecture shown in FIG. 17 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1700 may include a baseboard, or "motherboard," which is a printed circuit board to which a multitude of components or devices may be connected by way of a system bus or other electrical communication paths. One or more central processing units (CPUs) 1704 may operate in conjunction with a chipset 1706. The CPU(s) 1704 may be standard programmable processors that perform arithmetic and logical operations necessary for the operation of the computing device 1700.

The CPU(s) 1704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1704 may be augmented with or replaced by other processing units, such as GPU(s) 1705. The GPU(s) 1705 may comprise processing units specialized for but not necessarily limited to highly parallel computations, such as graphics and other visualization-related processing.

A chipset 1706 may provide an interface between the CPU(s) 1704 and the remainder of the components and devices on the baseboard. The chipset 1706 may provide an interface to a random-access memory (RAM) 1708 used as the main memory in the computing device 1700. The chipset 1706 may further provide an interface to a computer-readable storage medium, such as a read-only memory (ROM) 1720 or non-volatile RAM (NVRAM) (not shown), for storing basic routines that may help to start up the computing device 1700 and to transfer information between the various components and devices. ROM 1720 or NVRAM may also store other software components necessary for the operation of the computing device 1700 in accordance with the aspects described herein.

The computing device 1700 may operate in a networked environment using logical connections to remote computing nodes and computer systems through local area network (LAN). The chipset 1706 may include functionality for providing network connectivity through a network interface controller (NIC) 1722, such as a gigabit Ethernet adapter. A NIC 1722 may be capable of connecting the computing device 1700 to other computing nodes over a network 1716. It should be appreciated that multiple NICs 1722 may be present in the computing device 1700, connecting the computing device to other types of networks and remote computer systems.

The computing device 1700 may be connected to a mass storage device 1728 that provides non-volatile storage for the computer. The mass storage device 1728 may store system programs, application programs, other program modules, and data, which have been described in greater detail herein. The mass storage device 1728 may be connected to the computing device 1700 through a storage controller 1724 connected to the chipset 1706. The mass storage device 1728 may consist of one or more physical storage units. The mass storage device 1728 may comprise a management component 1010. A storage controller 1724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1700 may store data on the mass storage device 1728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1728 is characterized as primary or secondary storage and the like.

For example, the computing device 1700 may store information to the mass storage device 1728 by issuing instructions through a storage controller 1724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1700 may further read information from the mass storage device 1728 by detecting the physical states or characteristics of one or more particular locations within the physical storage units.

In addition to the mass storage device 1728 described above, the computing device 1700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1728 depicted in FIG. 17, may store an operating system utilized to control the operation of the computing device 1700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1728 may store other system or application programs and data utilized by the computing device 1700.

The mass storage device 1728 or other computer-readable storage media may also be encoded with computer-executable instructions, which, when loaded into the computing device 1700, transforms the computing device from a general-purpose computing system into a special-purpose computer capable of implementing the aspects described herein. These computer-executable instructions transform the computing device 1700 by specifying how the CPU(s) 1704 transition between states, as described above. The computing device 1700 may have access to computer-readable storage media storing computer-executable instructions, which, when executed by the computing device 1700, may perform the methods described herein.

A computing device, such as the computing device 1700 depicted in FIG. 17, may also include an input/output controller 1732 for receiving and processing input from a number of input devices, such as a keyboard, a mouse, a touchpad, a touch screen, an electronic stylus, or other type of input device. Similarly, an input/output controller 1732 may provide output to a display, such as a computer monitor, a flat-panel display, a digital projector, a printer, a plotter, or other type of output device. It will be appreciated that the computing device 1700 may not include all of the components shown in FIG. 17, may include other components that are not explicitly shown in FIG. 17, or may utilize an architecture completely different than that shown in FIG. 17.

As described herein, a computing device may be a physical computing device, such as the computing device 1700 of FIG. 17. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method, comprising:
    sending a request by a first client computing device for connecting with a second client computing device, wherein the request comprises identification information for identifying the second computing device, the first client computing device is associated with a first user, and the second computing device is associated with a second user;
    displaying a first video comprising the first user and a second video comprising the second user on an interface, wherein the second video is received from the second computing device, and wherein the first video and the second video are simultaneously displayed on the same interface;
    determining a first body part of the first user in the first video based on a selection of a representative of a first asset item associated with the second user, wherein the first asset item is a token representing an association between the second user and an object, and the first asset item serves to incentivize the second user to associate with different objects;
    rendering an image of the first asset item and combining the image into the first video; and
    displaying an effect of the first asset item being tried on the first body part of the first user on the interface.

2. The method of claim 1, further comprising:
    determining a position of rendering the image of the first asset item on the interface for display of the effect of the first asset item being tried on the first body part of the first user.

3. The method of claim 1, further comprising:
    receiving the first asset item from the second user based on the effect and user input.

4. The method of claim 1, wherein the first video and the second video are displayed on a first area of the interface and a second area of the interface, respectively.

5. The method of claim 1, further comprising:
    determining a second body part of the first user based on a selection of a representative of a second asset item associated with the second user; and
    displaying an effect of the second asset item being tried on the second body part of the first user.

6. The method of claim 1, further comprising:
    displaying a plurality of representatives corresponding to a plurality of asset items associated with the first user on the interface, wherein the plurality of representatives are displayed in a third area of the interface.

7. The method of claim 6, further comprising:
    in response to a selection of one of the plurality of representatives, sending a request for trying on a corresponding asset item by the second user.

8. The method of claim 6, further comprising:
    determining a body part of the second user in the second video based on a selection of one of the plurality of representatives;
    rendering an image of the corresponding asset item and combining the image into the second video; and
    displaying an effect of the corresponding asset item being tried on the body part of the second user.

9. The method of claim 8, further comprising:
    sending the corresponding asset item to the second user based on the effect and user input.

10. A system, comprising:
    at least one processor; and
    at least one memory communicatively coupled to the at least one processor and comprising computer-readable instructions that upon execution by the at least one processor cause the at least one processor to perform operations comprising:

sending a request by a first client computing device for connecting with a second client computing device, wherein the request comprises identification information for identifying the second computing device, the first client computing device is associated with a first user, and the second computing device is associated with a second user;

displaying a first video comprising the first user and a second video comprising the second user on an interface, wherein the second video is received from the second computing device, and wherein the first video and the second video are simultaneously displayed on the same interface;

determining a first body part of the first user in the first video based on a selection of a representative of a first asset item associated with the second user, wherein the first asset item is a token representing an association between the second user and an object, and the first asset item serves to incentivize the second user to associate with different objects;

rendering an image of the first asset item and combining the image into the first video; and displaying an effect of the first asset item being tried on the first body part of the first user on the interface.

11. The system of claim 10, the operations further comprising:

determining a position of rendering the image of the first asset item on the interface for display of the effect of the first asset item being tried on the first body part of the first user.

12. The system of claim 10, the operations further comprising:

receiving the first asset item from the second user based on the effect and user input.

13. The system of claim 10, wherein the first video and the second video are displayed on a first area of the interface and a second area of the interface, respectively.

14. The system of claim 10, the operations further comprising:

determining a second body part of the first user based on a selection of a representative of a second asset item associated with the second user; and displaying an effect of the second asset item being tried on the second body part of the first user.

15. The system of claim 10, the operations further comprising:

displaying a plurality of representatives corresponding to a plurality of asset items associated with the first user on the interface, wherein the plurality of representatives are displayed in a third area of the interface.

16. The system of claim 15, the operations further comprising:

in response to a selection of one of the plurality of representatives, sending a request for trying on a corresponding asset item by the second user.

17. The system of claim 15, the operations further comprising:

determining a body part of the second user in the second video based on a selection of one of the plurality of representatives;

rendering an image of the corresponding asset item and combining the image into the second video; displaying an effect of the corresponding asset item being tried on the body part of the second user; and sending the corresponding asset item to the second user based on the effect and user input.

18. A non-transitory computer-readable storage medium, storing computer-readable instructions that upon execution by a processor cause the processor to implement operations comprising:

sending a request by a first client computing device for connecting with a second client computing device, wherein the request comprises identification information for identifying the second computing device, the first client computing device is associated with a first user, and the second computing device is associated with a second user;

displaying a first video comprising the first user and a second video comprising the second user on an interface, wherein the second video is received from the second computing device, and wherein the first video and the second video are simultaneously displayed on the same interface;

determining a first body part of the first user in the first video based on a selection of a representative of a first asset item associated with the second user, wherein the first asset item is a token representing an association between the second user and an object, and the first asset item serves to incentivize the second user to associate with different objects;

rendering an image of the first asset item and combining the image into the first video; and displaying an effect of the first asset item being tried on the first body part of the first user on the interface.

19. The non-transitory computer-readable storage medium of claim 18, wherein the first video and the second video are displayed on a first area of the interface and a second area of the interface, respectively.

20. The non-transitory computer-readable storage medium of claim 18, the operations further comprising:

displaying a plurality of representatives corresponding to a plurality of asset items associated with the first user on the interface, wherein the plurality of representatives are displayed in a third area of the interface;

determining a body part of the second user in the second video based on a selection of one of the plurality of representatives;

rendering an image of the corresponding asset item and combining the image into the second video for display of an effect of the corresponding asset item being tried on the body part of the second user; and sending the corresponding asset item to the second user based on the effect and user input.

* * * * *